US010599761B2

(12) United States Patent
Cheesman

(10) Patent No.: US 10,599,761 B2
(45) Date of Patent: Mar. 24, 2020

(54) DIGITALLY CONVERTING PHYSICAL DOCUMENT FORMS TO ELECTRONIC SURVEYS

(71) Applicant: QUALTRICS, LLC, Provo, UT (US)

(72) Inventor: Larry Dean Cheesman, Provo, UT (US)

(73) Assignee: Qualtrics, LLC, Provo, UT (US)

( * ) Notice: Subject to any disclaimer, the term of this patent is extended or adjusted under 35 U.S.C. 154(b) by 230 days.

(21) Appl. No.: 15/698,263

(22) Filed: Sep. 7, 2017

(65) Prior Publication Data

US 2019/0073348 A1    Mar. 7, 2019

(51) Int. Cl.
*G06F 17/00*  (2019.01)
*G06F 17/24*  (2006.01)
*G06K 9/00*   (2006.01)

(52) U.S. Cl.
CPC ....... *G06F 17/243* (2013.01); *G06K 9/00449* (2013.01)

(58) Field of Classification Search
CPC .......................... G06F 17/243; G06K 9/00449
USPC ....................................................... 715/222
See application file for complete search history.

(56) References Cited

U.S. PATENT DOCUMENTS

| 6,826,540 | B1 * | 11/2004 | Plantec | G06Q 30/02 |
| | | | | 705/7.32 |
| 7,475,061 | B2 * | 1/2009 | Bargeron | G06K 9/00463 |
| 7,593,861 | B2 * | 9/2009 | Morrel-Samuels | |
| | | | | G06Q 10/0639 |
| | | | | 705/7.38 |
| 9,530,050 | B1 * | 12/2016 | Erol | G06F 17/241 |
| 2002/0122606 | A1 * | 9/2002 | Knowles | G06Q 10/10 |
| | | | | 382/305 |
| 2004/0128183 | A1 * | 7/2004 | Challey | G06Q 30/02 |
| | | | | 705/7.32 |
| 2004/0259067 | A1 * | 12/2004 | Cody | G06F 3/03545 |
| | | | | 434/323 |
| 2005/0004885 | A1 * | 1/2005 | Pandian | G06F 16/25 |
| 2007/0206223 | A1 * | 9/2007 | Treibach-Heck | |
| | | | | G06K 9/00469 |
| | | | | 358/1.15 |
| 2007/0282664 | A1 * | 12/2007 | Monster | G06Q 10/107 |
| | | | | 704/200 |
| 2011/0213722 | A1 * | 9/2011 | Carson | G06Q 10/10 |
| | | | | 705/317 |
| 2013/0231980 | A1 * | 9/2013 | Elgart | G06Q 50/20 |
| | | | | 705/7.38 |
| 2014/0122988 | A1 * | 5/2014 | Eigner | H04L 67/30 |
| | | | | 715/226 |

(Continued)

*Primary Examiner* — Laurie A Ries
(74) *Attorney, Agent, or Firm* — Keller Jolley Preece

(57) ABSTRACT

Embodiments of the present disclosure relate to digitally converting physical form documents to electronic surveys. For example, a survey system receives an image capture of a physical form document and analyzes the image capture to identify fields including questions within the physical form document. The survey system creates an electronic survey corresponding to the physical form document based on the contents of the fields (e.g., text, objects). Specifically, the survey system generates electronic survey questions for the fields based on the contents of the fields. After generating electronic survey questions for the fields in the image capture, the survey system provides the electronic survey for display to a respondent. Additionally, the survey system can complete an electronic version (e.g., an image) of the form document including the responses.

20 Claims, 15 Drawing Sheets

(56) References Cited

U.S. PATENT DOCUMENTS

| | | | |
|---|---|---|---|
| 2016/0104177 A1* | 4/2016 | Bridwell | G06Q 30/0203 705/7.32 |
| 2016/0283676 A1* | 9/2016 | Lyon | G06F 19/328 |
| 2018/0210870 A1* | 7/2018 | Jain | G06F 17/243 |

* cited by examiner

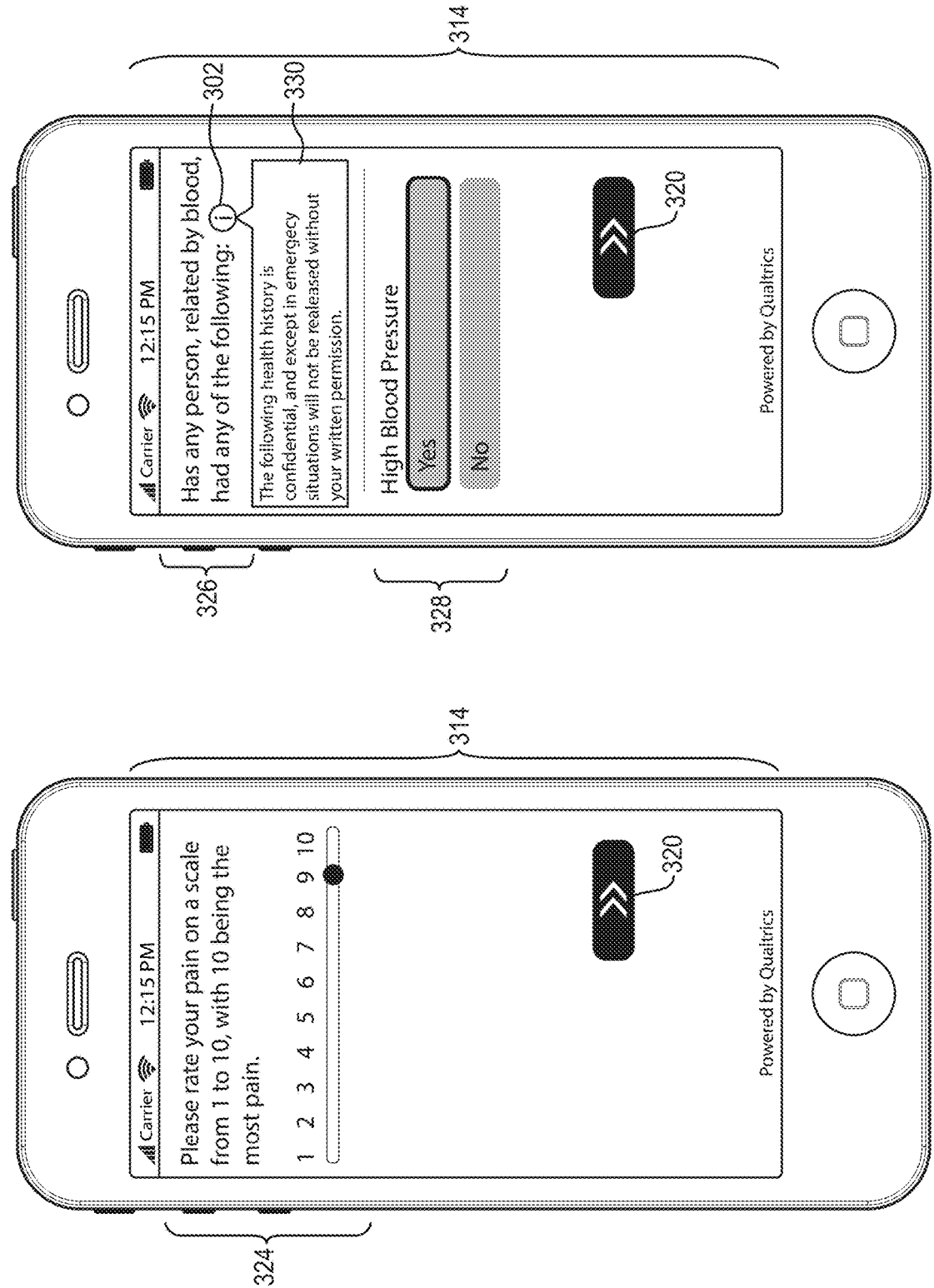

DIGITALLY CONVERTING PHYSICAL DOCUMENT FORMS TO ELECTRONIC SURVEYS

BACKGROUND

Many entities that provide a product or service request detailed information from recipients or potential recipients of the product or service. Specifically, the collected information can allow the entities to provide better products and services to the individuals. Additionally, many entities are required by law to collect personal information when providing certain services. For instance, medical providers, government entities, retail providers, and other service providers often use questionnaires to collect personal information about patients, citizens, customers, etc., to personalize a service to an individual or to comply with governmental regulations. Likewise, employers frequently need to request detailed information from employees.

Conventionally, some entities use physical form documents (e.g., a printed paper document) to obtain personal information from the recipients of the service. Physical form documents require individuals to enter the requested information by hand using a pen, for example. Due to the various drawbacks of physical form documents (e.g., illegible handwriting, complexity of document, time to write and read information, environmental concerns), some entities attempt to digitize a physical form document. However, simply digitizing a physical form document (e.g., into a PDF) often does not provide an individual or entity with any improvement in quality or time savings—and in fact—often causes confusion, difficulty, and more inefficiencies compared to having an individual provide handwritten information on a physical form document. Similarly, a digitized physical form document often creates difficulties and frustrations for entities that need access to the information.

Due to the above disadvantages, some entities may want to use an electronic question and answer format, for example, an electronic survey. Although conventional information collection systems allow for the creation of electronic surveys, conventional information collection systems usually require trained and experienced survey administrators to create and administer an electronic survey that effectively and accurately requests and provides personal information. Moreover, even given a trained and experienced survey administrator, conventional information collection systems typically require hours, days, or weeks for a survey administrator to create an electronic survey.

For example, conventional information collection systems often rely on direct user input in order to create an electronic survey. Due to this technological barrier, conventional information collection systems rely almost solely on a survey administrator's experience and knowhow to create the wording for a question, create an answer format, and organize a flow of an electronic survey. Relying almost exclusively on direct user input results in producing various inefficiencies with conventional information collection systems. For instance, a survey administrator will often create more electronic questions than is needed, which results in consuming additional storage space to store electronic survey data.

Similarly, creating an excessive number of questions consumes additional communication bandwidth to administer the electronic survey. Furthermore, with conventional information collection systems, electronic surveys will often have to be administered multiple times due to errors resulting from direct user input (e.g., based on lack experience or human error). Thus, conventional information collection systems often consume significant amounts of computer resources by administering erroneous electronic surveys, storing inaccurate electronic survey answers, and analyzing inaccurate, incorrect, or irrelevant response data.

Accordingly, these and other disadvantages exist with respect to conventional systems electronic survey systems.

SUMMARY

Embodiments of the present disclosure provide benefits and/or solve one or more of the foregoing or other problems in the art with systems and methods for converting physical form documents to electronic surveys. Specifically, in some embodiments, the systems and methods use an image capture of a physical form document (e.g., a paper document) to create an electronic survey that includes the content of the physical form document (e.g., information requests and answer choices). After a respondent completes the electronic survey, the systems and methods, for example, use the collected information from the electronic survey to digitally complete the image capture (or other electronic version) of the physical form document. Accordingly, in one or more embodiments, the systems and methods capture, analyze, and convert a physical form document into an electronic survey to collect information corresponding to the physical form document, store the collected information, and in some cases, create a completed version of the physical form document.

In particular, for example, the systems and methods create an electronic survey from a physical form document by analyzing an image capture of the physical form document to identify fields within the physical form document. By analyzing content for the identified fields, the systems and methods create electronic survey questions that correspond to the identified fields according to a set of available field types. In some embodiments, the systems and methods assign identifiers to the fields and associate the field identifiers with corresponding electronic survey questions. Additionally, the systems and methods provide the electronic survey including the electronic survey questions to a client device (e.g., a user's mobile device) for the user to complete the electronic survey. Moreover, in some embodiments and based on the field identifiers, the systems and methods correlate response data received from the user's client device to a corresponding field and insert the response data into an electronic version of the physical form document.

Additional features and advantages of the embodiments will be set forth in the description that follows, and in part will be obvious from the description, or can be learned by the practice of such exemplary embodiments. The features and advantages of such embodiments can be realized and obtained by means of the instruments and combinations particularly pointed out in the appended claims. These, and other features, will become more fully apparent from the following description and appended claims, or can be learned by the practice of such exemplary embodiments as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the disclosure and are not therefore considered to be limiting of its scope, the disclosure will be described and explained with additional specificity and detail through the use of the accompanying drawings, in which:

FIGS. 3A-3G illustrate example graphical user interfaces for generating and administering an electronic survey based on a physical form document in accordance with one or more embodiments;

DETAILED DESCRIPTION

Figure 1:
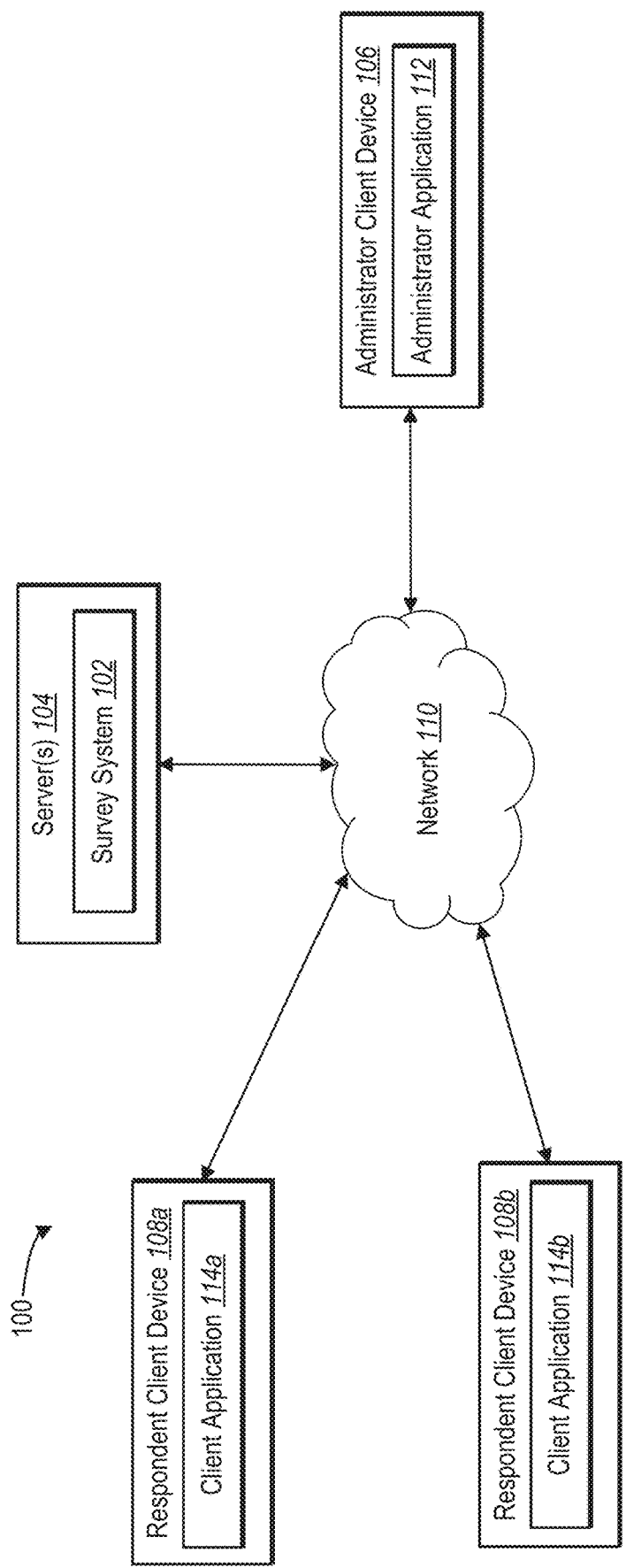
FIG. 1 illustrates a block diagram of a digital communication environment in which an electronic survey system operates in accordance with one or more embodiments.

One or more embodiments disclosed herein provide an electronic survey system that converts physical form documents to electronic surveys. In one or more embodiments, the survey system converts a physical form document (i.e., a paper version of a form document) to an electronic survey. Specifically, the electronic survey system analyzes an image capture of the physical form document to identify various fields in the physical form document and generate electronic survey questions corresponding to the identified fields. When a respondent completes the electronic survey, the electronic survey system uses the response information to fill out an electronic version of the physical form document, which a user can then use to create a new physical copy or electronically store. Accordingly, the electronic survey system allows an administrator to quickly and easily convert a physical form document to an electronic survey, and also allows a respondent to complete the physical form document by completing an electronic survey.

In one or more embodiments, the electronic survey system (or simply "survey system") uses a combination of optical character recognition and other image processing techniques to identify fields in a physical form document. In particular, the survey system identifies the fields by recognizing areas of the physical form document that include separate blocks of text, input fields, graphical shapes, lines, images, or other printed objects. Additionally, analyzing the image capture allows the survey system to determine that various portions of the physical form document are associated with each other (e.g., part of the same question or response section). Thus, the survey system can distinguish separate fields within the physical form document to understand content and a layout of the content of the physical form document.

After identifying and distinguishing fields within the physical form document, the survey system generates electronic survey questions that correspond to the contents of the identified fields. To generate an electronic survey question, the survey system determines a field type that corresponds to a prompt (e.g., question or request for information) included in the field. Based on the field type and prompt, the survey system can select a question type. The survey system also determines whether the field includes a response portion, and if so, a response type that corresponds with the response portion (e.g., multiple choice, alphabetical text input, numerical text input). The survey system then generates an electronic survey question that contains the prompt and any identified responses based on the contents of the field.

As most physical form documents include multiple fields, the survey system can generate multiple electronic survey questions based on the multiple fields. Accordingly, the survey system also generates an electronic survey that includes electronic survey questions that the survey system generates from the image capture of the physical form document. To create an electronic survey, the survey system can determine a survey question order from the identified fields of the image capture to organize the electronic survey questions in the electronic survey. After generating the electronic survey, the survey system can provide users access to the electronic survey. For instance, the survey system can send or otherwise provide access to the electronic survey to allow respondents to complete the electronic survey that corresponds to a physical form document. Based on user input that a user provides in response to an electronic survey question, the survey system can receive and store response data (e.g., a respondent's answer input) for each electronic survey question within the electronic survey.

In one or more embodiments, the survey system can use response data for completing and generating a version of the physical form document that includes a respondent's response data. In particular, the survey system can map the response data from a respondent to corresponding fields within the image capture of the physical form document. Consequently, the survey system can automatically complete the image capture (or other electronic version) of the physical form document with the response data and provide the completed image capture to the respondent and/or to a survey administrator. The respondent and/or survey administrator can then create a completed physical copy of the physical form document having the response data and/or store the completed electronic version of the form document.

As described herein, the survey system provides advantages over conventional systems and methods for collecting information requests through a physical form document. Specifically, the survey system improves a technological process related to digitizing physical form documents by converting physical form documents into electronic surveys. In particular, while conventional systems can create a generic electronic version of a physical document, such as a PDF, the resulting electronic version provides little to no advantages to increasing the efficiency, accuracy, and ease of requesting and collecting information related to a physical document. In contrast to conventional systems, one or more embodiments of the survey system go beyond a simple digitization of a physical form document by analyzing characteristics of a physical form document to automatically create an electronic survey having electronic survey questions that collect information corresponding to the physical form document.

Moreover, whereas conventional systems required administrators to gain expert knowledge and spend hours, days, or weeks building an electronic survey, examples of the survey system described herein allow a user (e.g., administrator) to convert a physical document to an electronic survey in an efficient, easy, and intuitive manner. Indeed, in many embodiments, the administrator only need to scan and provide a physical form document to the survey system, and the survey system automatically generates and electronic survey having questions and responses designed to capture information needed for the physical form document. Thus, the survey system described herein removes the need for administrators to have significant knowledge of often complex systems, as well as significantly reduces the time to create an electronic survey from hours, days, or weeks to just a few moments.

The survey system also aids respondents of a physical form document in understanding the content of the document. In particular, because physical form documents can vary in complexity and amount of information requested from a respondent, conventional methods and systems cannot provide sufficient aid to a respondent in providing the requested information correctly. By using image analysis, optical character recognition, and machine-learning algorithms, the survey system is able to deconstruct a physical form document to recreate the electronic survey in a way that a respondent can easily understand. Furthermore, the survey system can provide the form document in a way that people with certain disabilities (e.g., blindness) can more easily provide response data. Accordingly, the survey system also improves the accuracy of response data corresponding to physical form documents.

Furthermore, the survey system described herein overcomes technological barriers of conventional systems that rely almost solely on the time-consuming and inaccurate process to create an electronic survey. For instance, examples of the survey system reduce the consumption of storage space to store electronic survey data, and bandwidth to administer and electronic survey, due to reducing the amount of erroneous questions, duplicative questions, and other errors. For instance, unlike conventional systems, the survey system avoids or eliminates the need to administer an electronic survey multiple times due to errors resulting from direct user input (e.g., based on lack experience or human error). Therefore, in contrast to conventional system, the survey system consumes significantly less computer resources by generating accurate electronic surveys from a physical form document, administering the accurate electronic surveys, storing relevant and accurate response data, and/or analyzing accurate, correct, or relevant response data.

As used herein, the term "physical form document" or "form document" refers to a physical copy of a form document used to collect information. For instance, the term physical form document can include a printed document that requests information in the form of questions, fillable sections, or other identifiable portions that allow a person to provide information in the document. Examples of physical form documents include medical intake forms, government forms, application forms, financial forms, education forms, or any other physical form document that any entity can provide to an individual to collect information from the individual.

As used herein, the term "electronic survey" or simply "survey" refer to an electronic communication used to collect information. For example, the term survey can include an electronic communication in the form of a poll, questionnaire, census, or other type of sampling. To illustrate, an electronic survey can include an electronic communication that includes one or more electronic survey questions based on information requested on a physical form document. Further, the term survey as used herein can generally refer to a method of requesting and collecting electronic data from respondents via an electronic communication distribution channel. As used herein, the term "respondent" refers to a person or entity that participates in, and responds to, a survey. Also, as used herein, the term "administrator" refers to a person or entity that creates and causes the administration of a survey.

Additionally, as used herein, the term "electronic survey question," "survey question," or simply "question" refers to a prompt included in a survey to invoke a response from a respondent. For example, a survey question can include one of many different types of questions, including, but not limited to, perception, multiple choice, open-ended, ranking, scoring, summation, demographic, dichotomous, differential, cumulative, dropdown, matrix, net promoter score (NPS), single textbox, heat map, and any other type of prompt that can invoke a response from a respondent. A survey question can include a prompt portion as well as an available answer portion that corresponds to the survey question.

As used herein, the term "response" refers to electronic data a respondent provides with respect to an electronic survey question. The electronic data can include content and/or feedback from the respondent in response to a survey question. Depending on the question type, the response can include, but is not limited to, a selection, a text input, an indication of an answer selection, a user provided answer, and/or an attachment. For example, a response to a multiple choice survey question can include a single data point that indicates a selection of one answer from a plurality of possible answers in the multiple choice survey question. Similarly, a response to a prompt to enter specific information (e.g., a name) can include text data indicating the requested information.

As used herein, the term "field" refers to a defined portion of a document. For example, a field can include a portion of a document that provides information to, or requests information from, an individual (e.g., a respondent). In some examples, lines, boxes, groupings of content, positions, colors, or other document characteristics can define a field. In addition, a field can include various types of content. For example, field content can include text content such as question/field labels, prompts, answers choices, disclaimers, clarification information, notes, and/or other types of information that will be apparent based on this disclosure. Additionally, a field can include non-text content such as text entry boxes, images, visual cues, colors, or other visual, non-text data types. Accordingly, fields in a physical form document can include, but are not limited to, question fields, instruction fields, title fields, or general information fields. A field can also include a plurality of separate portions including two or more different types of information. For example, a question field can include a prompt portion that includes a prompt, an answer portion that includes one or more answers, and even an instruction portion that includes instructions corresponding specifically to the prompt.

FIG. 1 illustrates a digital communication environment 100 in which a survey system 102 operates. The description associated with FIG. 1 provides an overview of the digital communication environment 100 that includes the survey system 102. A more detailed description of the components and processes of the survey system 102 are provided in relation to the remaining figures.

Specifically, FIG. 1 illustrates a server(s) 104 (or simply "server 104"), an administrator client device 106, and a plurality of respondent client devices 108a, 108b. Each of the administrator client device 106 and respondent client devices 108a, 108b can be associated with users (e.g., an administrator and a plurality of respondents, respectively). As described in greater detail below, the server 104, the administrator client device 106, and/or the respondent client devices 108a, 108b can perform or provide some or all of the functions and processes of the methods and systems described herein.

The devices in the digital communication environment 100 can communicate with one or more other devices in the digital communication environment 100. For example, the server 104, administrator client device 106, and the respondent client devices 108a, 108b can each communicate with every other device the over a network 110. In addition, the server 104, the administrator client device 106, and the respondent client devices 108a, 108b can be any type of computing device. For example, in one embodiment, the server 104 is a single server computing device. Alternatively, the server 104 includes a plurality of server computing devices, such as cloud-based server devices, server devices within a datacenter, and/or a plurality of server computing devices connected via a network 110.

Similarly, the administrator client device 106 and the respondent client devices 108a, 108b can be one or more of any type of computing device that allow the administrator and/or respondents, respectively, to perform the operations and functions described herein. Example computing devices can include mobile devices (e.g., smartphones, tablets, laptops, wearable devices), desktop devices, and/or other types of devices. Additional details with respect to computing devices and network 110 are discussed below with respect to FIGS. 8-9.

Furthermore, the computing devices 106, 108a, and 108b can include an image capture device (digital camera, scanner, etc.) for obtaining an image capture of a real-world object, such as a physical form document. As used herein, the term "image capture" and "image" refers to a digital representation of an object (e.g., a digital photo, electronic document file, or other digital format that based on output of an image capture device. An image capture can be any digital image format, including JPEG, PNG, TIFF, etc.

Although FIG. 1 illustrates a particular arrangement of the administrator client device 106, server 104, respondent client devices 108a, 108b, and network 110, various additional arrangements are possible. For example, the administrator client device 106 can directly communicate with the server 104 hosting the survey system 102, bypassing the network 110. Further, while only one administrator client device 106 and two respondent client devices 108a, 108b are illustrated, the environment 100 can include any number of administrator client devices and respondent client devices.

Referring to FIG. 1, and as an overview of the survey system 102, the administrator client device 106 can communicate with the server 104 to cause the survey system 102 to create an electronic survey based on a physical form document. For instance, an administrator can use the administrator application 112 in association with an image capture device to capture and provide an image capture of a physical form document to the server 104. Upon receiving the image capture, the survey system 102 can analyze the image capture to create an electronic survey. Specifically, the survey system 102 analyzes the received image capture and creates an electronic survey that corresponds to the content of the physical form document. To illustrate, the resulting electronic survey includes electronic survey questions that correspond to the questions and other information from the physical form document.

After generating an electronic survey, the survey system 102 can provide the electronic survey to one or more of the respondent client devices 108a, 108b. For example, respondents can use client applications 114a, 114b to access an electronic survey, provide responses to electronic survey questions, and otherwise and participate in an electronic survey. For instance, in one embodiment, based on the administrator client device 106 sending the image capture, the survey system 102 can provide the electronic survey (or a link to the electronic survey) to the administrator client device 106 via the network 110. The administrator client device 106 can then provide the electronic survey (or the link to the electronic survey) to one or more of the respondent client devices 108a, 108b. Alternatively, the survey system 102 can provide the electronic survey directly to the respondent client device.

The respondent client devices 108a, 108b allow respondents to respond to an electronic survey. In particular, the respondents can use client applications 114a, 144b (e.g., a web browser or other application compatible with the electronic survey) on the respondent client devices 108a, 108b to provide responses to electronic survey questions. In one or more embodiments, the client applications 114a, 114b is the same application and administrator application 112 for capturing an image of the physical form document. Based on user input that a respondent provides in response to a survey question (e.g., via an input device such as a touch screen, keyboard, mouse), the respondent client devices 108a, 108b provides response data to the survey system 102. Although FIG. 1 illustrates only two respondent client devices 108a and 108b, it is understood that the survey system 102 can provide electronic surveys, and receive response data from, any number of respondent client devices.

The survey system 102 can use the response data from the respondent client devices 108a, 108b to create completed instances of the form document. Specifically, the survey system 102 can use the response data to populate an electronic version of the physical form document. For example, the survey system 102 can enter a respondent's response to an electronic survey question into a corresponding location in the electronic version of the form document (e.g., the image capture of the physical form document or other electronic version). The survey system 102 provides the completed electronic versions of the form document to the respondent client devices 108a, 108b and/or to the administrator client device 106. Additionally, the respondent client devices 108a, 108b or the administrator client device 106 can print the completed electronic versions of the physical form document.

Figure 2A:
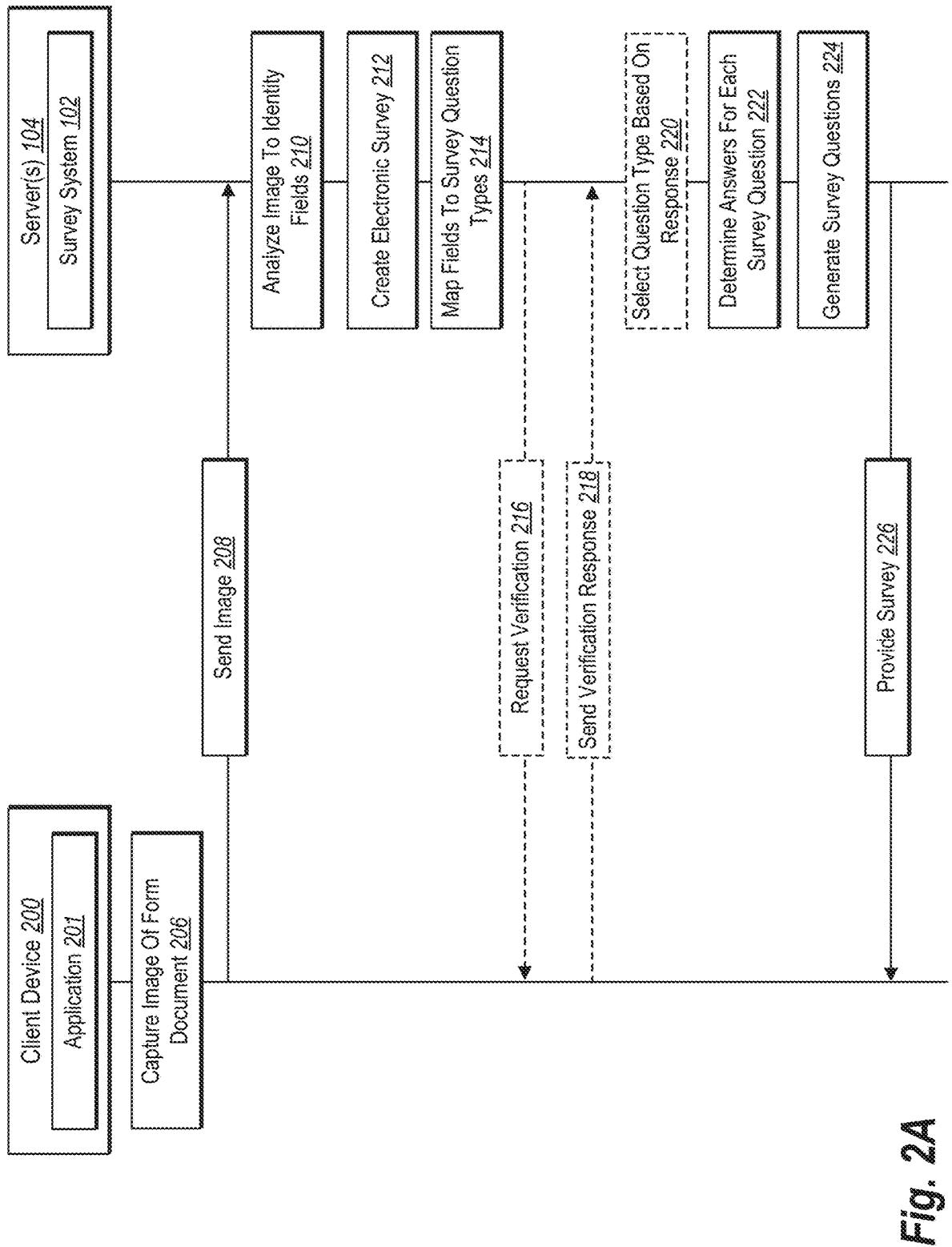
FIGS. 2A-2C illustrate sequence-flow diagrams for generating and administering an electronic survey based on a physical form document in accordance with one or more embodiments.
Figure 2B:
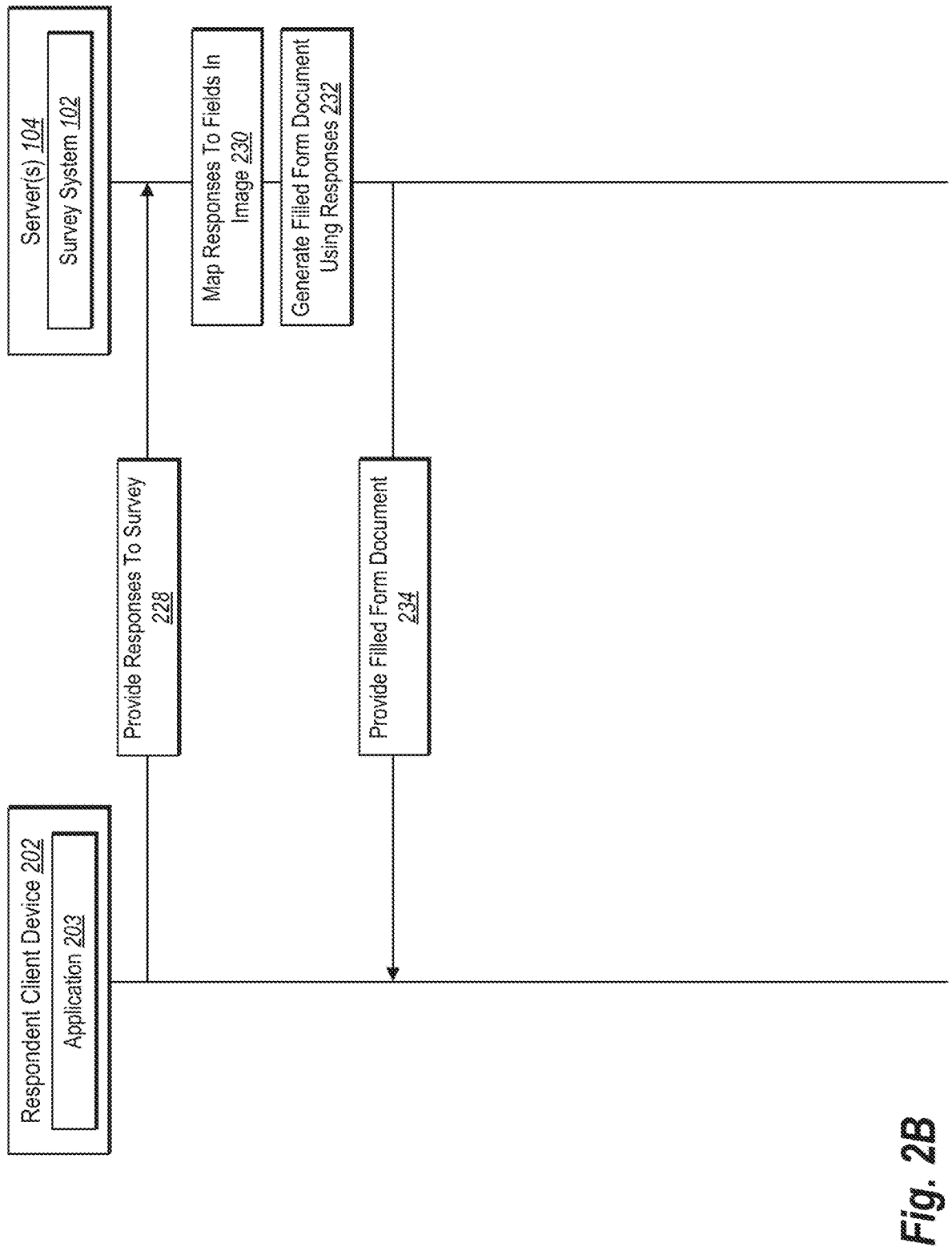
Figure 2C:
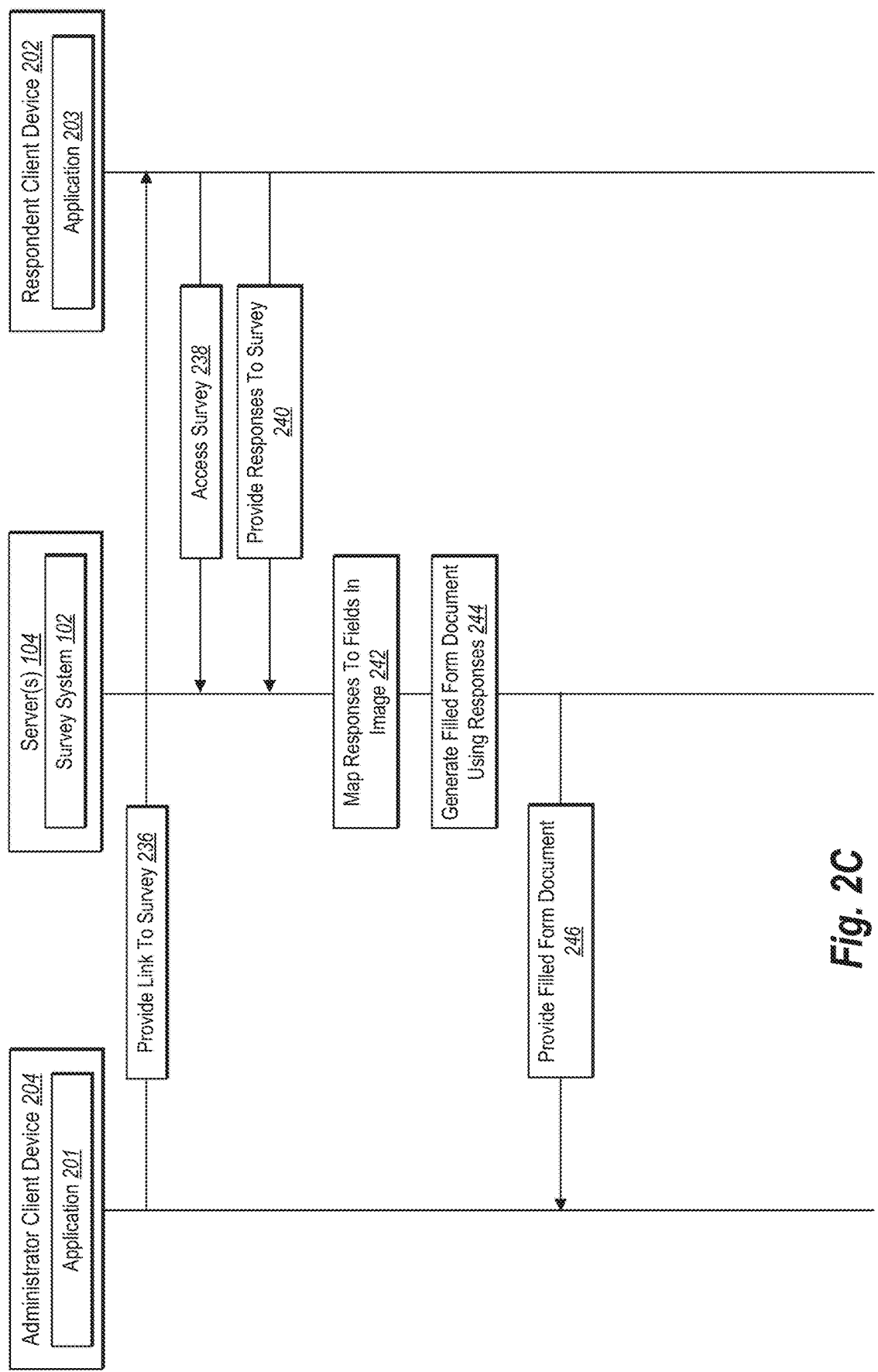

FIGS. 2A-2C illustrate process diagrams for converting a physical form document to an electronic survey and administering the electronic survey. As illustrated in FIGS. 2A-2C, the server 104, survey system 102, client device 200 (e.g., respondent client device 202 or the administrator client device 204), respondent client device 202, and applications 201 and 203 can correspond to the respective devices and applications described above with respect to FIG. 1.

FIG. 2A illustrates an example embodiment of a process for analyzing an image capture of a physical form document to generate an electronic survey. In one or more embodiments, as illustrated in FIG. 2A, a process to convert a physical form document to an electronic survey begins with a user (e.g., an administrator or a respondent) accessing the client device 200 to capture an image of a form document 206. Specifically, the user can interact with client device 200 to capture an image of a physical form document using client application 201 on the client device 200. The client application 201 can include software that allows a user to view a camera interface for capturing images and storing on the client device 200. For instance, the client device 200 can store image captures of various formats, as previously mentioned.

After capturing an image of the form document, the client device 200 sends the image 208 to the survey system 102, as shown in FIG. 2A. In particular, the client device 200 can communicate with the survey system 102 to upload the image to a server via a network connection, as illustrated in FIG. 1. In at least some embodiments, the client device 200 sends the image to the survey system 102 automatically in response to capturing the image. Alternatively, the client device 200 can send the image to the survey system 102 in response to a user request, via the client application, to upload the image.

Based on the survey system 102 receiving the image from the client device 200, the survey system 102 analyzes the image for converting the contents of the image (i.e., the contents of the physical form document) to an electronic survey. Specifically, FIG. 2A illustrates that the survey system 102 analyzes the image to identify fields 210 using one or more image processing techniques. In one or more embodiments, the survey system 102 uses optical character recognition ("OCR") to analyze the image of the physical form document. For instance, the survey system 102 can use OCR to identify text within the physical form document.

The survey system 102 can use language analysis to distinguish fields from one another by identifying separate sentences, paragraphs, or other natural breaks or separations in the text. For example, the survey system 102 can identify letters, numbers, special characters, words, phrases, sentences, paragraphs, and blocks of text from the identified text. Additionally, the language analysis can allow the survey system 102 to understand context and content of the identified text. To illustrate, the survey system 102 can use natural language processing to distinguish separate questions and prompts from each other and to identify answers, response sections, and additional information sections of the physical form document that correspond to the specific questions and prompts.

In one or more embodiments, the survey system 102 uses shape or image recognition techniques to identify non-text information within the image of the physical form document. As mentioned briefly above, the survey system 102 can recognize shapes, images, colors, text boxes, or any other type of non-text data within the physical form document using various image processing techniques. For example, the survey system 102 can use image patch analysis to divide the image into a plurality of image patches and then analyze the image patches to identify connected, non-text objects within the image. Alternatively, the survey system 102 can use other types of object recognition techniques to identify and distinguish non-text information within the image. In any case, the survey system 102 is able to recognize shapes, patterns, images, or other non-text information within an image in connection with questions or other information in a form document.

The survey system 102 can also process the identified non-text information to determine whether the objects correspond to a particular prompt or group of prompts within the physical form document, and to which prompt or prompts the objects correspond. Specifically, by analyzing the text information and the non-text information, the survey system 102 can determine whether a field includes both text information and non-text information. For instance, a field can include any combination of a question prompt, one or more answers, and non-text objects. The survey system 102 can identify a field by determining whether each group of text and/or objects corresponds to any other groups of text and/or objects based on the content and locations of the text/objects within the image, as described in more detail below with respect to FIGS. 3A-3G.

In response to identifying one or more fields in the image of the physical form document, the survey system 102 creates an electronic survey 212, as illustrated in FIG. 2A. In particular, the survey system 102 creates an electronic survey that will include one or more survey questions based on the content of the identified field(s) from the physical form document. For example, the survey system 102 can include survey creation software that provides features associated with creating electronic surveys. The survey system 102 can thus create electronic surveys that include a variety of different types of electronic survey questions and content. Furthermore, creating the electronic survey can include assigning a survey identifier (e.g., a numeric value) to the electronic survey to allow the survey system 102 to track responses and other information associated with the electronic survey.

As shown in FIG. 2A, once the survey system 102 has identified the fields in the physical form document and created a survey, the survey system 102 maps the fields to survey question types 214. In particular, the survey system 102 accesses a list or a database of available survey question types to determine which type most closely corresponds to each field. For example, the survey system 102 can determine that a field includes a prompt and a plurality of answers from which a respondent can select, indicating that the field corresponds to a multiple choice question type. In another example, the survey system 102 can determine that a field includes text and a box next to the prompt in which a respondent can write a response, indicating that the field corresponds to a text entry question type. Accordingly, the survey system 102 automatically recognizes a type of each field for mapping to a question type based on the types of electronic survey questions that the survey system 102 is capable of creating/administering. The survey system 102 can also request manual input from a user to manually mark one or more fields to assist the survey system 102 in distinguishing one or more fields.

Optionally, FIG. 2A illustrates that the survey system 102 requests verification 216 of a mapping for a field by sending a request to the client device 200 (if necessary). The survey system 102 can determine that a given field is not easily discernible as a single question type or is unable to determine a question type for the given field (e.g., a confidence level associated with the mapping is below a threshold). In such instances, the survey system 102 can request that the user provides input to assist the survey system 102 in selecting the correct question type for the field. For example, the survey system 102 can select a candidate question type based on the content of the field and send a request to the client device 200 for the user to verify whether the candidate question type is correct. The user can verify whether the candidate question type is correct by sending a verification response 218 indicating that the candidate question type is correct or incorrect.

Alternatively, the survey system 102 can select a plurality of candidate question types for the given field. For instance, the survey system 102 can generate a score representing how closely each available question type corresponds to the field. The survey system 102 can select a predetermined number of candidate question types (e.g., by picking the n number of candidate question types with the highest scores) to provide to the client device 200. Alternatively, the survey system 102 can compare the scores to a threshold and then provide candidate question types that have a score that meet the threshold to the client device 200. The user can then select a question type from the provided candidate question types that most closely corresponds to the field.

After receiving a response from the client device 200, the survey system 102 can select a question type based on the response 220, as illustrated in FIG. 2A. In particular, if the survey system 102 provides a candidate question type to the client device 200 that the user verifies, the survey system 102 selects the verified candidate question type. Alternatively, if the user does not verify any of the candidate question types that the survey system 102 provided to the client device 200, the survey system 102 can select one or more additional candidate question types to provide to the client device 200 for further verification. The survey system 102 can provide as many or as few verification requests to the client device 200 for any fields that the survey system 102 cannot or does not map to a survey question type.

As illustrated in FIG. 2A, when the survey system 102 has mapped each of the identified fields in the image, the survey system 102 determines answers for each of the survey questions 222. Specifically, the survey system 102 determines how many possible answers each field includes and the types of answers based on the question types. For example, the survey system 102 determines whether a field includes more than one possible answer based on the survey question type. To illustrate, when determining that a field corresponds to a multiple choice question type, the survey system 102 determines that the field includes more than one possible multiple choice answer. In another example, when determining that a field corresponds to a text entry question type, the survey system 102 determines that the field includes an answer box for a user to enter text.

Once the survey system 102 has determined the question types and responses for the identified fields from the image, the survey system 102 generates the survey questions 224, as shown in FIG. 2A. For example, the survey system 102 can use the survey creation software to create electronic survey questions for the electronic survey that the survey system 102 previously generated. The survey system 102 generates an electronic survey question by including the content of the field. To illustrate, the survey system 102 can include the language from the field, as determined using optical character recognition, for the question prompt and for each answer portion in the field, if any.

Additionally, the survey system 102 can associate the generated survey questions with the electronic survey using identifiers. Specifically, the survey system 102 can assign a unique question identifier to each survey question and a unique answer identifier to each answer. Thus, the survey system 102 can associate a survey question and its corresponding answer(s) to each other and to the electronic survey by mapping the question identifier and answer identifier(s) to the survey identifier previously assigned to the electronic survey. For example, the survey system 102 can store the survey identifier, question identifier, and answer identifier(s) in a table or other mapping medium. The survey system 102 can similarly map the identifiers for other questions, and their corresponding answers, to the survey identifier in the table or mapping medium.

In one or more embodiments, the survey system 102 also determines any dependencies or relationships between various fields of the image. For example, the survey system 102 can determine that a field contains a question, information (e.g., labels or description), or other contents related to another field. To illustrate, the survey system 102 can determine that a first field can include a question and a second field can include a question related to the question in the first field. Similarly, the survey system 102 can determine that the second field includes general information, instructions, or other contents related to the question in the first field.

The survey system 102 can determine that the contents of different fields are related by analyzing the content using various image and text processing techniques. For instance, the survey system 102 can analyze text within a plurality of fields to determine that the fields correspond to each other based on text within one or both of the fields that indicates a relationship between the fields. To illustrate, the survey system 102 can determine that a question has a conditional relationship with another question based on the language of the questions or numbering within the fields (e.g., "1A", "1B"). In another example, the survey system 102 can determine that the spatial relationship between the fields within the image (e.g., the fields are proximate one another) indicate the relationship.

In at least some embodiments, the survey system 102 is also capable of determining that a single field contains two separate questions. In particular, a first question can include an answer that includes or implies a second, conditional question. For example, a question can have a conditional relationship with another question based on objects within the field, such as a multiple choice answer including a text field to input text if a respondent selects that answer. Accordingly, the survey system 102 can identify such relationships when analyzing the fields by analyzing content, context, positions, or other characteristics of the fields within the image.

After generating survey questions and other instructions or information, in one or more embodiments, FIG. 2A illustrates that the survey system 102 provides the survey 226 to the client device 200. Specifically, the survey system 102 provides the electronic survey including the generated questions and other information or instructions, if applicable, to the client device 200 (e.g., a respondent's client device, as illustrated in FIG. 2B, or an administrator's client device, as illustrated of FIG. 2C) that captured the image of the form document and sent the image to the survey system 102. For example, the survey system 102 can provide the electronic survey to the client device 200 in the same client application or user interface that the user of the client device 200 used to capture the image of the physical form document. Alternatively, the survey system 102 can provide the electronic survey to the client device 200 in a different application or user interface.

While FIG. 2A illustrates that the survey system 102 provides the survey to the client device 200 that captured and sent an image of the physical form document to the survey system 102, the survey system can provide the survey to a different client device. For example, the survey system 102 can provide the survey to one or more devices that an administrator of the physical form document selects. To illustrate, the survey system 102 can provide the survey directly to devices of the administrator's choosing, or provide a link to a hosted version of the survey. Additionally, the survey system 102 can provide a preview of the survey to the administrator's client device to allow the administrator to verify the accuracy of the electronic survey prior to sending to respondent client devices.

As mentioned previously, the survey system 102 can provide the survey to either an administrator client device or a respondent client device. FIG. 2B illustrates an embodiment in which the survey system 102 provides the survey to a respondent client device 202. Specifically, the survey system 102 provides the survey to a respondent client device 202 for a respondent to respond to the survey. For example, the respondent client device 202 can include software (e.g., a client application 203) that allows the respondent to view and interact with the electronic survey.

When the respondent responds to the electronic survey, the respondent client device 202 can provide the responses to the survey 228 to the survey system 102, as shown in FIG. 2B. In particular, the respondent client device 202 can be in communication with the survey system 102 by way of a network communication. In one or more embodiments, the respondent client device 202 communicates with the survey system 102 after each response that the respondent provides for each question, or for specific sets of questions. Alternatively, the respondent client device 202 can communicate with the survey system 102 after the respondent has responded to all of the questions in the survey.

FIG. 2B illustrates that, in response to receiving the responses from the respondent client device 202, the survey system maps the responses to fields in the image 230. Specifically, the survey system 102 can assign response identifiers to the responses from the respondent client device 202. Each of the response identifiers can correspond to a response input (e.g., a selected answer, text input) from the respondent client device 202 for a specific answer. To illustrate, if the user selects an answer for a multiple choice question, the survey system 102 assigns a response identifier to the response (i.e., an indication that the user selected a specific answer). Additionally, the survey system 102 associates the response with the selected answer (e.g., by mapping the response identifier to the answer identifier for the selected answer).

Because the selected answer is mapped to the survey question, the response is also mapped to the survey question. Mapping the response to the survey question allows the survey system 102 to associate a response to the corresponding field within the image. For instance, the survey system 102 can map the question identifier to the specific field, such as by storing location information and/or a field identifier with the question identifier. Accordingly, the survey system 102 maps the response identifier assigned to the response from the respondent client device 202 to the field (and the corresponding location information) within the image.

As illustrated in FIG. 2B, the survey system 102 also generates a filled form document using the responses 232 based on the previously established mappings of the responses to the locations of the corresponding fields within the image. In particular, the survey system 102 inserts the responses from the respondent client device 202 into an electronic version of the physical form document at the locations of the corresponding answers. For example, the survey system 102 can use the location information for the fields from the image to digitally insert the responses into the image. Digitally inserting the responses can include inserting text, filling in checkboxes or radio buttons, or otherwise inserting digital representations of the responses based on the answer types and content of the responses.

Alternatively, the survey system 102 can insert the responses into a new electronic version of the physical form document such as a fillable PDF or other electronic document format. For instance, the survey system 102 can analyze the image and create a new electronic document that includes the content of the image. The survey system 102 can then insert the responses into the new electronic document using an insertion method that is appropriate for the format of the electronic document. To illustrate, the survey system 102 can insert text or other objects into image layers if the new electronic document is an image, text fields if the new electronic document is a fillable PDF with interactive fields, etc.

The survey system 102 also provides the filled form document 234 to the respondent client device 202 in response to generating the filled form document, as shown in FIG. 2B. Specifically, the survey system 102 can send the filled form document to the respondent client device 202 for the respondent to view within a user interface of a client application. For example, the survey system 102 can send the filled form document to the respondent client device 202 via the client application from which the respondent provided the image of the physical document to the survey system 102. Alternatively, the survey system 102 can send the filled form document to the respondent client device via another communication method including, but not limited to, an email, text message, or instant message.

As mentioned previously, while the survey system 102 can provide the survey and the filled form document to a requesting device (e.g., the respondent client device 202), the survey system 102 can also provide the survey and/or the filled form document to one or more other devices that an administrator of the physical form document selects. FIG. 2C illustrates an administrator client device 204 in addition to the survey system 102 and respondent client device 202. In one or more embodiments, the administrator client device 204 provides the image of the physical form document to the survey system 102 for the survey system 102 to provide the resulting electronic survey to the respondent client device 202. For example, the administrator client device 204 can capture an image of a physical form document that the administrator wants to provide to one or more respondents via their corresponding client devices.

As briefly mentioned previously, the survey system 102 can provide the survey (e.g., a preview of the survey) to an administrator to allow the administrator to verify the accuracy of the survey. After the administrator is satisfied with the survey, the administrator can use the administrator client device 204 to provide a link to the survey 236 to the respondent client device 202, as illustrated in FIG. 2C. For example, the survey system 102 can host the survey on one or more servers and provide a link to the survey to the administrator client device 204 in response to generating the survey. The administrator can then send the provided link to one or more respondents via email, text, instant message, etc., through which the respondents can access the survey.

As shown in FIG. 2C, when the respondent client device 202 receives the link to the survey from the administrator client device 204, the respondent can access the survey 238 from the survey system 102 by using the respondent client device 202 to follow the link. For example, the respondent can access the survey using a client application that automatically accesses the survey in response to receiving the link, and provides the survey to the respondent within a user interface of the client application. Alternatively, the respondent can access the survey by manually selecting a link within a message to access the survey within the client application. In at least some instances, the client application includes a web browser that accesses a URL for the survey. In other examples, the client application includes a mobile application that corresponds to the survey system 102.

As also illustrated in FIG. 2C, after accessing the survey from the provided link, the respondent can use the respondent client device 202 to provide responses to the survey 240. Specifically, the respondent can enter responses to the survey into a client application via one or more input methods. The respondent client device 202 can communicate with the survey system 102 to provide the responses after the respondent answers each question, blocks of questions, or after the respondent completes the survey. Thus, the respondent client device 202 can communicate with the survey system 102 one or more times during or after the respondent's interactions with the survey to provide response information for questions in the survey.

As described above, the survey system maps the responses to fields in the image 342. Because the survey system 102 assigns unique identifiers to the various components of the survey (e.g., the survey itself, survey questions, survey answers) and to the fields in the image, the survey system 102 can map response identifiers to the corresponding fields in the image. Using the mappings between responses and fields, as well as location information for each of the fields, the survey system 102 generates a filled form document using the responses from the respondent client device 202. In particular, for each respondent that responds to the survey, the survey system 102 generates a separate filled form document using the responses 244 (e.g., electronic document with the responses from the corresponding respondent).

In one or more embodiments, the survey system 102 provides the filled form document 246 to the administrator client device. For example, after a respondent has completed the survey and sent the responses to the survey system 102, the survey system generates an image or other electronic version of the physical form document with the response information inserted and then provides the completed electronic document to the administrator client device 204. The administrator can print the document or store the electronic version for later reference. Furthermore, the survey system 102 can provide the response information from the electronic survey to the administrator, e.g., by allowing the administrator to access the response information with an administrator account.

By providing the filled form document directly to the administrator client device 204, the survey system 102 can simplify the process for both the administrator and the respondent. For instance, the survey system 102 can eliminate the need for the respondent to print the completed form document. Additionally, the survey system 102 can eliminate the need for the respondent to send the completed document to the administrator. In at least some embodiments, the survey system 102 can provide the filled form document to the respondent client device 202 for the respondent to store.

In addition to or alternative to creating a completed form document based on response data to an electronic survey, the survey system can also maintain response data within a survey database to allow a survey administrator to analyze the response data across respondents. For example, an administrator may want to generate a completed form document due to administration, legal, or regulatory purposes. Additionally, because the respondent information is captured via electronic survey, the survey system can compile all response data within a survey database to provide a deeper analysis and understanding of the respondents.

For example, a medical center may request that patients complete a medical office form, and the medical center can use the survey system 102 to create and administer an electronic survey as described above. The survey system 102 can combine the response data from respondents and analyze the response data to easily provide various insights. For example, based on analyzing response data across all patients, the survey system can easily provide insights about the patients as a whole, e.g., age, health conditions, frequency of visits, residence information, etc. Based on the analysis of response data as a whole, the medical center can discover potential correlations, such as, a group of patients within a particular geographic region are experiencing similar health issues.

Although FIGS. 2A-2C illustrate a specific order of operations and processes for converting physical form documents to electronic surveys and providing completed form documents based on responses. For example, the administrator client device 204 or respondent client device 202 can perform one or more of the operations that the survey system 102 performs in FIGS. 2A-2C. In other examples, the survey system 102 can be implemented within the administrator client device 204 or the respondent client device 202.

FIGS. 3A-3G illustrate example graphical user interfaces ("GUIs") on a respondent client device 300. The GUIs provide various views of a client application on the respondent client device for responding to an electronic survey created from a physical form document. In particular, the client application of FIGS. 3A-3G can include an application that allows a user (e.g., a respondent) to obtain an image capture of a physical form document and then interact with an electronic survey generated from the image capture. In one or more embodiments, the client application includes a browser-based application or mobile application that allows a respondent to provide responses to an electronic survey and communicate with a survey system to complete an electronic version of the physical form document based on the responses.

In one or more embodiments, the respondent client device 300 includes a mobile computing device such as a smartphone. Although the respondent client device 300 of FIGS. 3A-3G is illustrated as a mobile computing device, the respondent client device 300 can be another type of computing device that allows the respondent to perform operations associated with completing an electronic survey generated from a physical form document. For example, the respondent client device 300 can be a desktop device, laptop device, or other mobile or handheld device.

Figure 3A:
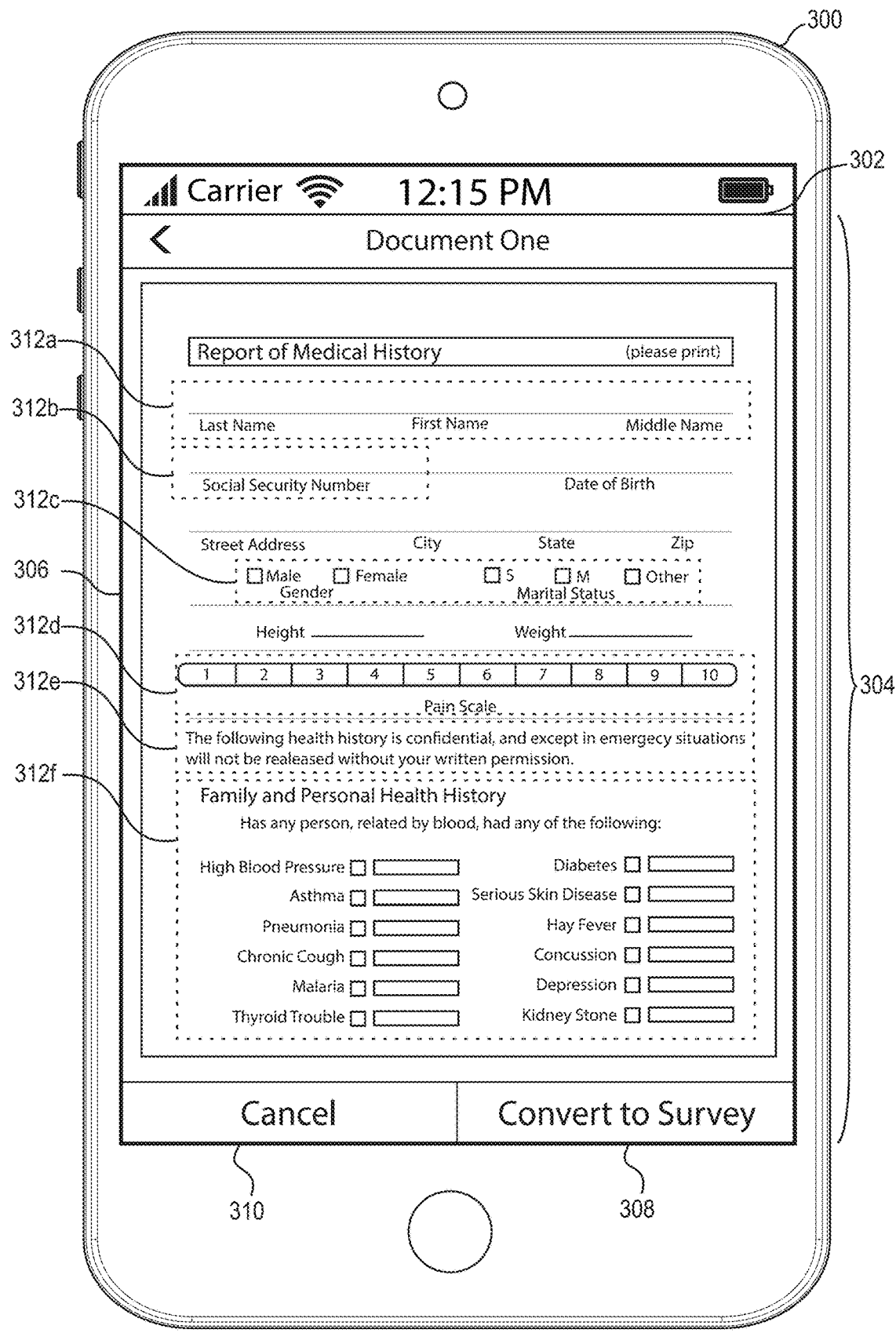

With reference to FIG. 3A, the respondent client device 300 includes a client application 302 that allows a respondent to capture an image of a physical form document. Specifically, the client application 302 includes an image capture interface 304 that displays an image 306 representing a physical form document. The image capture interface 306 allows a user to capture images using an image capture device of the respondent client device 300. For example, the respondent can use the respondent client device 300 to capture the image 306 of a physical form document.

In one or more embodiments, the client application 302 stores the image 306 with a file type that is compatible with converting the contents of the image 306 to an electronic survey. For instance, the client application 302 can store the image 306 as a file format based on a setting associated with the survey system 102. To illustrate, the client application 302 can capture the image 306 of the physical form document and store the image 306 in a specific format. Alternatively, the client application 302 can capture the image 306 in any file format, and the survey system 102 can modify the format or perform the conversion process on a variety of different formats.

As illustrated, a physical form document can include a plurality of different fields that include information associated with one or more requests for information. For instance, the physical form document can include a plurality of questions (e.g., as part of a form or questionnaire). When capturing the image 306, the client application 302 captures the contents of the fields in the physical form document within the image. To illustrate, the image 306 includes a plurality of distinguishable fields (e.g., "Last Name", "First Name", "Middle Name", "Social Security Number") in a medical history form. As shown, each field includes a request for information or instructions/general information associated with a request.

As previously described, the survey system analyzes the image 306 of the physical form document to identify different fields in the image 306. In one or more embodiments, the respondent client device 300 sends the image 306 to the survey system in response to the respondent selecting a convert option 308 to convert the physical form document to an electronic survey. For example, after the respondent captures the image 306 using the respondent client device 300, the client application 302 can display the image 306 in the image capture interface 304. Additionally, the image capture interface 304 can include the convert option 308 to convert the physical form document represented in the image 306 to an electronic survey. The image capture interface 304 can also include a cancel option 310 to cancel the current operation and return the respondent to a previous interface (e.g., a camera interface by which the respondent can capture a new image).

When analyzing the image 306, the survey system identifies and analyzes the various fields in the image 306 to identify questions and other information within the image. In particular, the survey system can identify a plurality of different types of questions or fields within the image 306. FIG. 3A illustrates a plurality of different portions of the image 306, each portion including one or more fields of a specific type of content. While FIG. 3A highlights various fields within the image 306, the highlighted fields indicate several different types of questions or information that a physical form document can include. In other examples, a physical document many include more or fewer fields, or different types of fields than those illustrated in FIG. 3A.

To illustrate, a first portion 312a includes a plurality of fields with a request for name information for the respondent. A second portion 312b includes a field with requests for a social security number of the respondent. A third portion 312c includes a plurality of fields with requests for a gender and marital status of the respondent. A fourth portion 312d includes a field that requests a pain scale of the respondent. A fifth portion 312e includes a field that provides information related to one or more fields within the image 306. A sixth portion 312f includes a plurality of fields with requests for a family and personal health history of the respondent.

Figure 3C:
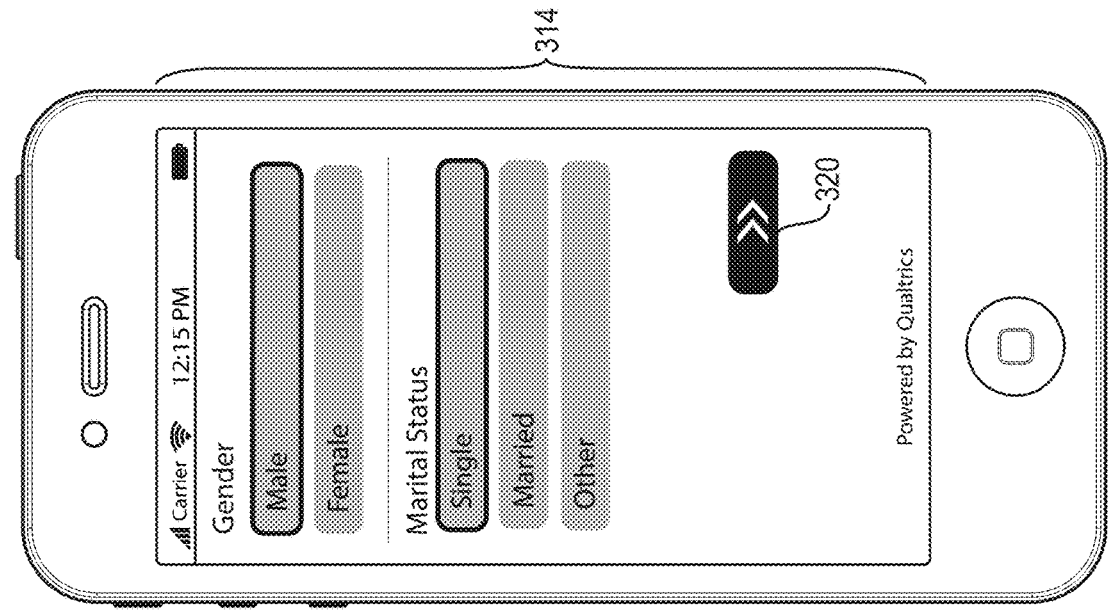
Figure 3B:
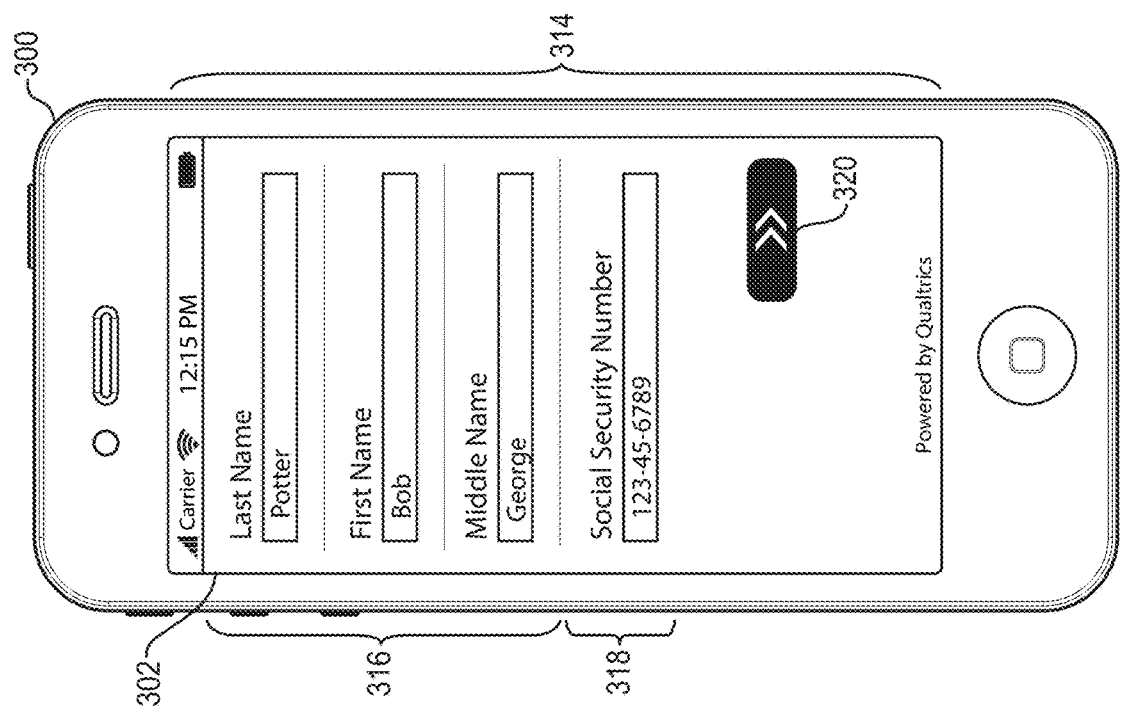

Various aspects of the fields and the operations that the survey system performs to convert each of the highlighted portions of the image 306 are described in more detail below with respect to FIGS. 3B-3F. In particular, FIGS. 3B-3F illustrate a survey interface 314 in the client application 302 that displays an electronic survey generated from the image 306 and then provided to the respondent client device 300. For instance, FIG. 3B illustrates a plurality of electronic survey questions that the survey system generated based on a plurality of fields in the image 306.

In some embodiments, when analyzing the plurality of fields, the survey system can determine the type of question or information within a given field based on the contents of the field using a machine-learning algorithm. In one or more embodiments, the survey system trains a machine-learning algorithm to identify the different types of questions using a plurality of training sample questions linked to question types. The survey system can maintain a database of possible question types from a training dataset that allows the survey system to train the machine-learning model to categorize content from identified fields in one of the possible question types (or field types). Because fields can include instructions or information in addition to requests for information, the survey system can also train the machine-learning model to identify instructions or information that corresponds to a request for information from a respondent.

To illustrate, the survey system can determine that a field includes a question type that allows a respondent to input text, as in the fields from the first portion 312a. Specifically, the survey system can determine that the fields include text input questions by determining that the fields include a text line (as shown in FIG. 3A) or text box typically associated with a text input question type. Additionally, the survey system can analyze text within a field to determine a context of the text that allows the survey system to correctly categorize the question type for the field. Accordingly, the survey interface 314 of FIG. 3B includes a plurality of electronic survey questions 316 generated from the fields in the first portion 312a of the image 306 (i.e., "Last Name", "First Name", "Middle Name"). Additionally, the survey interface 314 includes an electronic survey question 318 corresponding to the field in the second portion 312b of the image 306.

In addition to determining that the fields in the first portion 312a and the second portion 312b include text input questions, the survey system can determine one or more constraints that apply to the fields. For example, the survey system can determine that the fields from the first portion 312a have a constraint that limits the text inputs to alphabetical characters. The survey system can identify such a constraint based on the contents of the field, such as by determining that name information is restricted to allowing respondents to enter only alphabetical characters. Similarly, the survey system can determine that the field in the second portion 312b requesting a social security number from the respondent is constrained to numerical values. More specifically, the survey system can determine that a formatting of the social security (e.g., the number of digits) should also be constrained based on the type of information requested. The survey system can then apply the identified constraints to the corresponding electronic survey questions in the electronic survey to limit the types of responses the respondent can input into the survey interface 314.

Based on generating the survey, the survey system can provide one or more survey questions to the client device 300. For example, FIG. 3B also illustrates that the respondent can interact with the survey questions to provide responses. For example, the respondent can select an answer or answer portion to input a response based on the prompt of the question. To illustrate, for the "Last Name" question, the respondent can enter the respondent's last name as a response in a text box. In such an instance, "Last Name" is a prompt portion that includes the question prompt and the text box is an answer portion where the respondent can provide the response. As described in more detail below, certain types of questions can include a plurality of possible answers, each answer corresponding to a separate answer portion of the survey question.

When the respondent has entered responses for the survey question, the respondent can select a continue option 320 to proceed with the electronic survey. While the survey includes additional questions, the continue option 320 can cause the survey interface 314 to display additional questions. When the respondent is finished providing responses to the survey questions in the survey (e.g., there are no more questions remaining), the survey interface 314 can finalize the survey for completing an electronic version of the physical form document, as described in more detail with respect to FIG. 3G below.

In one or more embodiments, when the user selects the continue option 320, the survey interface 314 changes the displayed survey questions to one or more other questions from the survey. For example, FIG. 3C illustrates the survey interface 314 includes a plurality of electronic survey questions 322 corresponding to the fields in the third portion 312c of the image 306. Specifically, the electronic survey questions 322 request gender and marital status information from the respondent. The survey system determines that the questions are multiple choice questions based on each field including a plurality of answer portions corresponding to a prompt portion.

In at least some embodiments, the survey system determines the content of the answers based on a context of the field and can even expand answers provided in the survey interface 314 based on the amount of available space. For instance, the survey system can analyze the field including the request for marital status information and infer that the "S" and "M" correspond to "Single" and "Married" options. The survey system can then include the inferred answers in the corresponding electronic survey question to provide clarity to the respondent.

After determining the prompts and answers for each of the multiple choice questions, the survey system generates each of the electronic survey questions 322 to include a plurality of possible answers for the corresponding prompt (e.g., "Single," "Married," "Other" for the marital status of the respondent; "Male", "Female" for the gender of the respondent). The respondent can then select answers for each of the electronic survey questions 322 by interacting with corresponding answer elements within the survey interface 314. In one or more embodiments, the survey interface 304 allows the respondent to interact with an answer element by tapping on the element on a touchscreen of the respondent client device 300. The respondent can then select the continue option 320 to continue to the next set of questions.

FIG. 3D illustrates an electronic survey question 324 corresponding to a field including a pain scale from the fourth portion 312d from the image 306. Specifically, the survey system can determine that the field includes a slider question type based on the contents of the field. For example, the survey system can determine that the pain scale best corresponds to a slider question type based on the presence of a graphical object within the field that indicates a plurality of discrete numerical values from which the respondent can select. By identifying the discrete values (e.g., a number scale or text values that indicate a certain relationship between the values) and determining that the graphical object in the answer portion resembles a scale (or based on the context of text in the prompt), the survey system determines that the answer is most accurately reproduced using a slider question type.

The survey system generates the electronic survey question 324 within the survey interface 314 to include a slider with the corresponding values. Furthermore, the respondent can interact with the slider to select a response for the electronic survey question 324. When the respondent is ready to move on to the next question, the respondent can select the continue option 320.

FIG. 3E illustrates information from a plurality of fields in a plurality of different portions of the image 306. In particular, FIG. 3E illustrates information related to the plurality of questions in the sixth portion 312f of the image 306. For example, the sixth portion 312f includes a general prompt 326 (i.e., "Has any person, related by blood, had any of the following") that applies to all of the questions within the sixth portion 312f. Additionally, each individual question includes a separate prompt (e.g., "High Blood Pressure") with a set of answers that correspond to the individual question. The survey system can determine that the general prompt 326 applies to a plurality of questions within a plurality of fields in the sixth portion 312f based on a location of the general prompt 326 relative to the plurality of fields, the context of the general prompt 326 and/or questions, or other characteristics of the general prompt 326 or questions from the image 306.

While FIG. 3E only illustrates a first question 328 from the sixth portion 312f within the survey interface 314, the survey system can display any number of questions within the survey interface 314 that based on display dimensions of the respondent client device 300. The survey system can alternatively display a plurality of questions with a navigation element (e.g., a scrollbar) that allows the respondent to view a plurality of survey questions, or a single question if the question is too large to fit within the survey interface 314. Additionally, the survey system can display the general prompt 326 with the first question 328 from the sixth portion 312f and then remove the general prompt 326 for each subsequent question from the sixth portion 326. Alternatively, the survey system can display the general prompt 326 in the survey interface 314 for each of the questions to which the general prompt 326 applies, such as in an overlay that remains on the screen even after the respondent selects the continue option 320.

The survey system can also determine that instructions or general information is associated with one or more fields within the image 306. For instance, FIG. 3E illustrates information 330 from the fifth portion 312e that corresponds to the plurality of questions in the sixth portion 312f. The information 330 can include a label or a disclaimer, or provide additional information that can be useful to the respondent when completing the questions in the corresponding portion. The survey system can provide the information 330 in the survey in a variety of ways, including, but not limited to, associating the information 330 with a tooltip element 332 or other graphical element that allows the respondent to select the graphical element to view the information 330.

In one or more embodiments, the survey system also identifies conditional questions that are dependent on responses to one or more other questions. In particular, displaying a question can be dependent on the respondent selecting a specific answer from another question. For example, the survey system can determine that a question is a conditional question based on text indicating that the question is conditional. In another example, the survey system can infer a conditional question based on the presence of an object or text associated with another question. To illustrate, the survey system can infer a conditional question based on the presence of a text line or text box next to a specific answer in another question. Accordingly, the survey system can use a variety of image and/or text processing techniques to detect a conditional question.

Figure 3F:
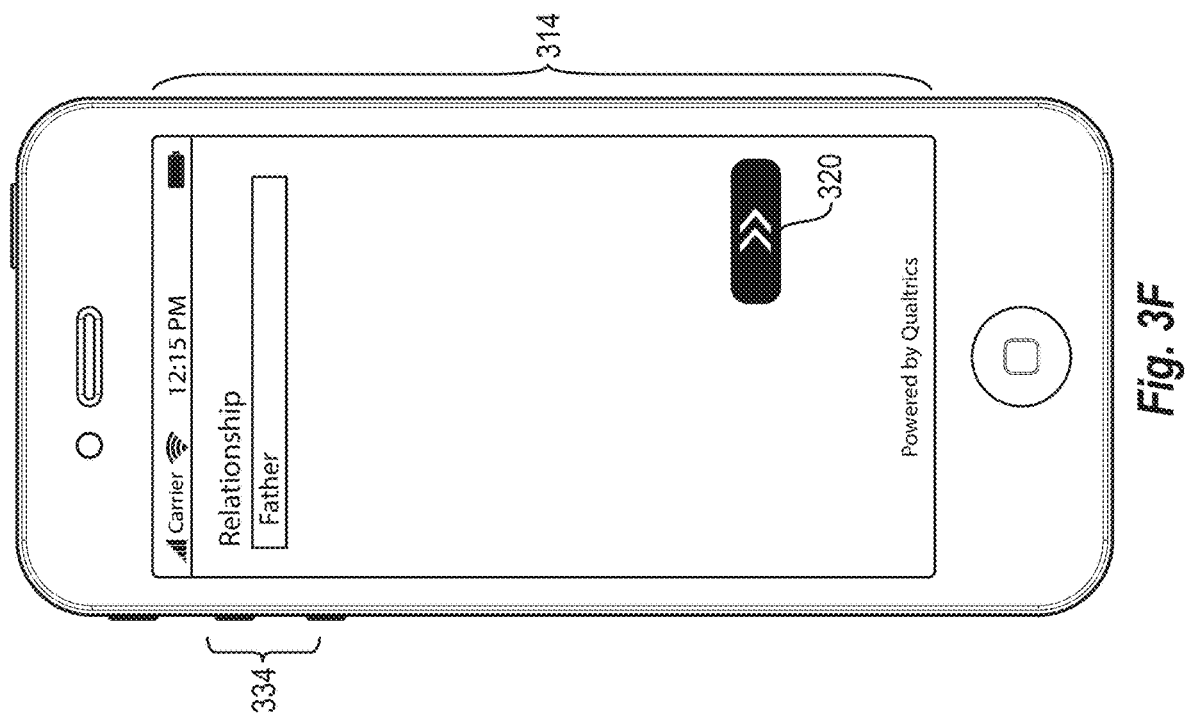

FIG. 3F illustrates a conditional question 334 that is dependent on the respondent's response to the first question 328 of FIG. 3E. For instance, the survey system can infer the conditional question 334 based on the context of the general prompt 326 and the presence of a text box in the field corresponding to the first question 328 within the image. If the respondent answers "Yes" to the first question 328, the response triggers the display of the conditional question 334 that requests the relationship of the family member with high blood pressure. If the respondent answers "No" to the first question 328, the survey system can cause the client application 302 to skip the conditional question 334, such that the client application 302 does not display the conditional question 334 to the respondent and proceeds with the next question from the survey. After the respondent enters a response to the conditional question 334, the respondent can select the continue option 320 and proceed with the rest of the survey (or complete the survey if there are no more unanswered questions).

While FIGS. 3B-3F illustrate a plurality of questions with certain question types from the physical form document represented in the image 306 of FIG. 3A, the survey system is capable of generating electronic survey questions with question or content types not shown. For example, the survey system can generate electronic survey questions including, but not limited to, matrix table questions (e.g., ranking a satisfaction level for a plurality of different aspects of a service), rank order questions (e.g., ranking a list of answers), heat map questions (e.g., requesting a respondent to highlight a portion of an image of a body indicating a location of pain), or other question types that the survey system can detect within an image of a physical form document. The survey system can also generate questions that request that a respondent digitally attach information (e.g., a digital photo) to the survey to respond to the questions. Additionally, the survey system can convert each of the questions detected in the image 306 of FIG. 3A to an electronic survey question to allow the respondent to provide responses for all of the identified fields in the image 306.

In one or more embodiments, the survey system organizes questions within the electronic survey based on the positions, order, or grouping of questions within the image 306. In particular, the survey system can determine an order in which to display the electronic survey questions based on an order of the questions within the physical form document. To illustrate, the physical form document can include question numbers that indicate an explicit order of the questions.

Alternatively, the survey system can infer an order of the questions based on relative positioning of the questions within the image 306. For instance, the survey system can determine an order of the questions based on a left-to-right and top-to-bottom flow of the fields within the image 306. The survey system can also take context of the questions into account when determining the order of the electronic survey questions so that questions are displayed with related questions (e.g., question dependencies, similar themes, visual relationships).

Figure 3G:
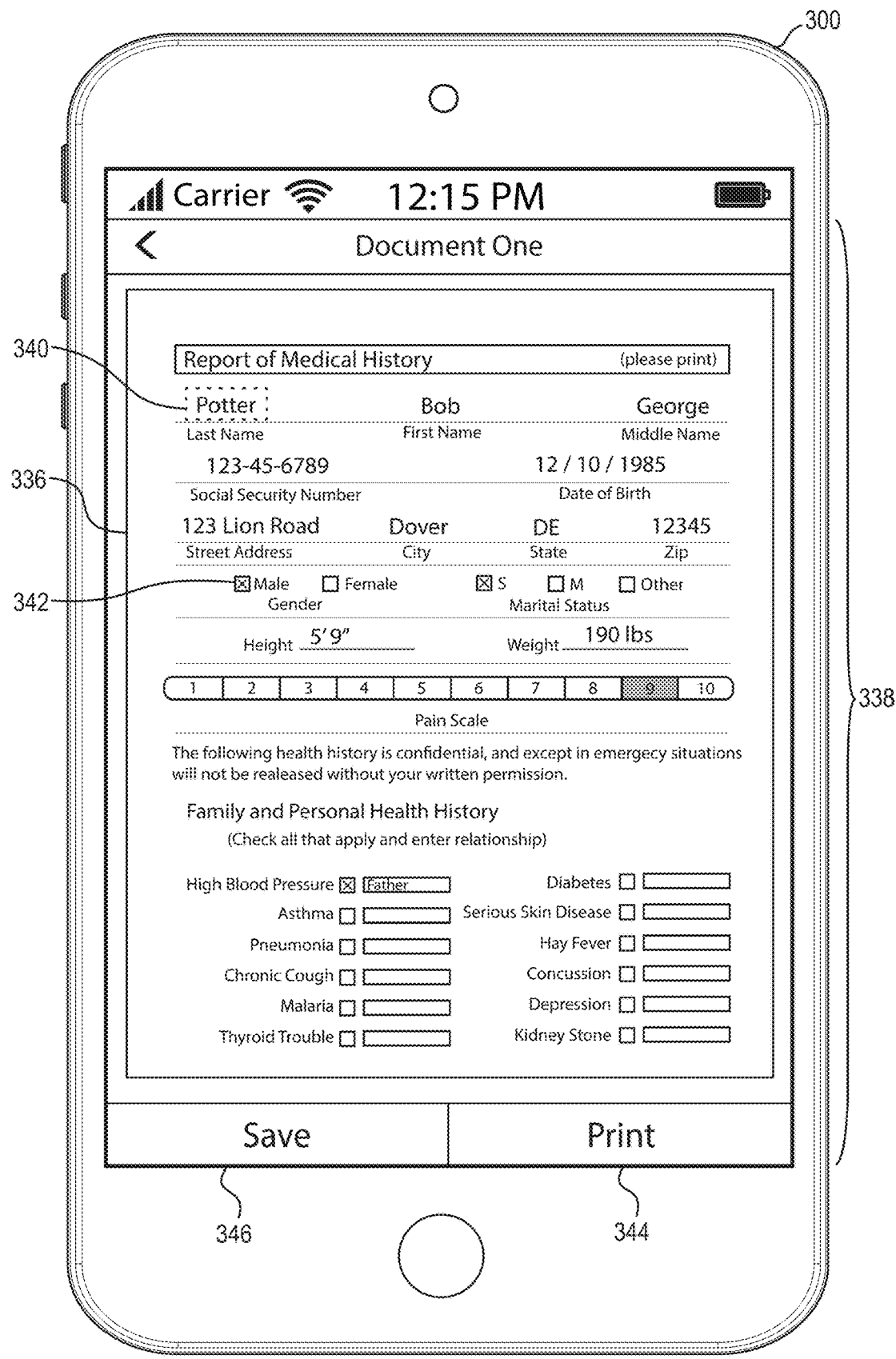

FIG. 3G illustrates an example image 336 of a filled form document within a document interface 338. The survey system generates the image 336 based on responses from the respondent to the electronic survey questions corresponding to the physical form document illustrated in FIG. 3A. Once the respondent has completed the electronic survey using the respondent client device 300, or each time the respondent client device 300 device displays a new question or set of questions, the respondent client device 300 can send the responses to the survey system for completing the physical form document. Specifically, the survey system uses the responses that the respondent provides to the electronic survey questions in the electronic survey to fill in the answer portions of the corresponding fields. The survey system can use the existing image of the physical form document or create a new electronic version of the physical form document that matches the original image and fill in answer portions of the fields with the corresponding responses.

As briefly mentioned previously, the survey system stores location information for answers to each question of the physical form document. In particular, the location information for an answer describes the location of the answer within the image 336. The location information for the answer can include coordinates of the answer within the image 336. For example, the location information can include coordinates of corners, edges, or other boundary points of an answer portion in which the respondent provides a response to the corresponding question. To illustrate, the survey system can determine the pixel coordinates of pixels at each corner of a text box or at edges of text line. In at least some embodiments, the survey system determines logical boundaries of an answer portion when the answer portion does not have exact, visible boundaries (e.g., a text line that corresponds to a plurality of different questions).

The survey system uses a mapping between a response and an answer identifier and location information associated with the answer identifier to determine where to insert the response in the image 336. To illustrate, the survey system can access a plurality of mappings associated with the electronic survey to identify the answer identifier that is mapped to the response identifier. The survey system then uses the location information that is associated with the answer identifier to determine the location of the answer portion of the corresponding field within the image 336. In at least some instances, the location information also includes dimensions of the answer portion, which allows the survey system to determine a location and a size of the response to input into the answer portion.

After determining the location of the answer within the image 336, the survey system then inserts the response into the answer portion. Specifically, the survey system places the response into the answer portion within the image 336 by inserting an object into the image 336 at the location. For instance, the survey system can insert text into the image 336 at a location of a text answer portion 340 if the response for the text answer portion 340 includes text input from the respondent. To illustrate, the survey system can determine a starting location, font size, font, or other characteristics for the text input at the location based on the length of the text (e.g., the number of characters) and the dimensions of the text answer portion 340.

In another example, if the response includes an indication that the user has selected an answer from a plurality of answers for a question, the survey system inserts a checkmark, "x", circle, or other mark indicating the selection of the answer. For example, the survey system can determine a location and dimensions of a checkbox answer portion 342 (e.g., a checkbox, radio button, or other graphical element via which a respondent would otherwise manually enter the response in the physical form document). The survey system uses the location and dimensions of the checkbox answer portion 342 to determine a type of response indicator and with which answer portion to enter the response indicator. To illustrate, in response to the survey system determining that the checkbox answer portion 342 includes a checkbox, the survey system inserts an "x" or a checkmark into the checkbox answer portion 342 at the corresponding location.

As illustrated, the survey system can determine how and where to input the response to an answer based on the type of question and the type of answer(s) associated with the question. In one or more embodiments, the survey system inserts the objects representing the responses as layers onto the image 336 while editing and then stores the image and layers as a compatible image file. The survey system can maintain the layers (e.g., so that the image is editable if the respondent later decides to change a response) or flatten the image to remove the layers. The respondent can select a print option 344 to print the image 336 to a physical copy and/or a save option 346 to store the image 336 on the respondent client device 300 for the respondent's records.

While FIG. 3G illustrates the filled form document as an image, the survey system can create an electronic document with another format type. To illustrate, the survey system can create a fillable PDF file that includes modifiable fields representing the answer portions and containing the responses from the respondent. For instance, the survey system can represent a question with a text box in one or more answer portions with a fillable text field in the electronic version. This would allow the user to manually modify one or more of the responses that the survey system automatically filled into the electronic document based on the responses from the respondent. Additionally, a fillable PDF document would allow the survey system to enter text into the electronic version within the text boxes.

Figure 4B:
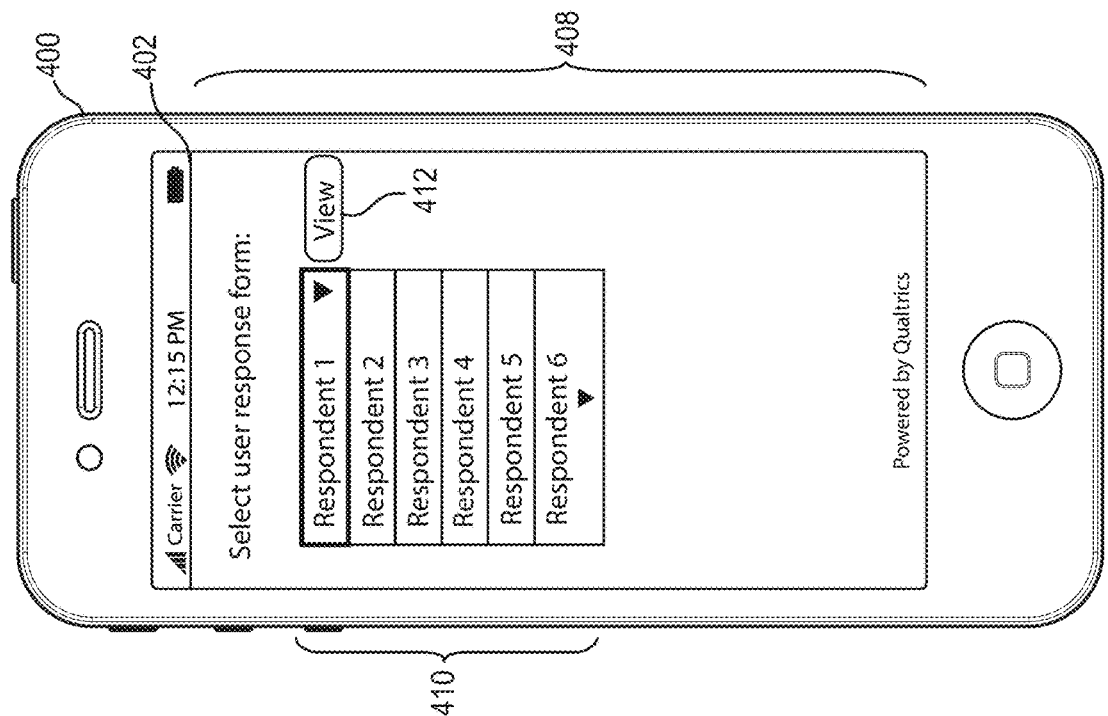
FIGS. 4A-4B illustrate example graphical user interfaces for administering an electronic survey corresponding to a physical form document in accordance with one or more embodiments.
Figure 4A:
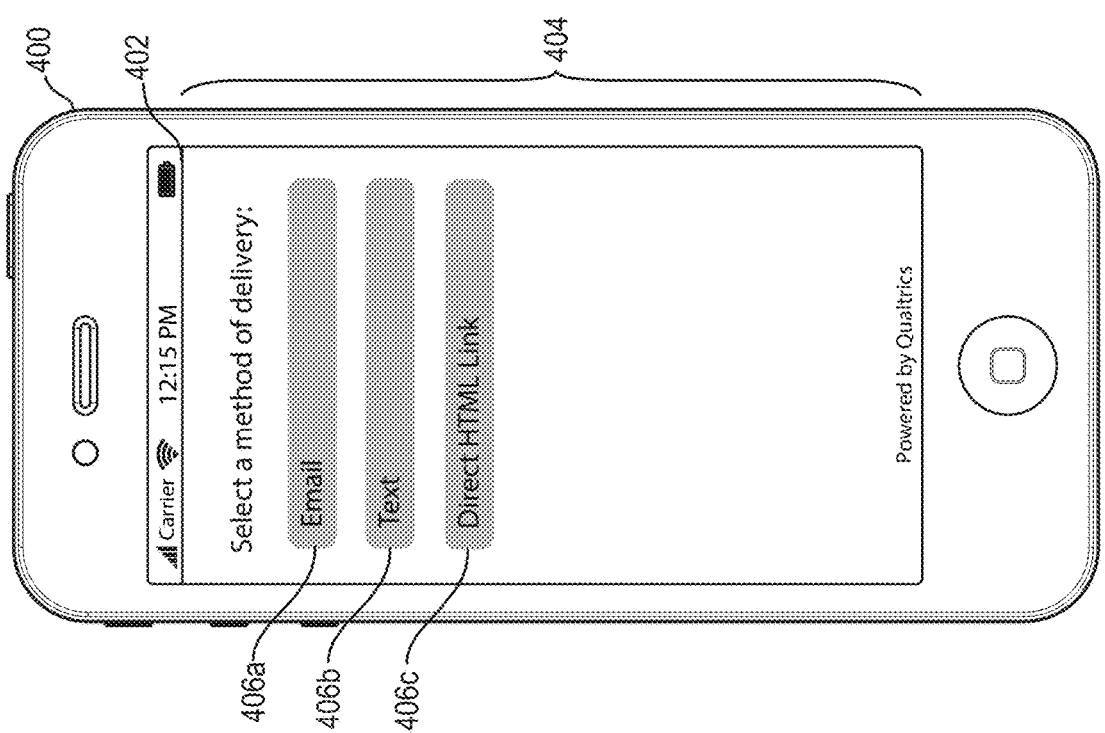

As mentioned previously, the survey system can also allow an administrator of a physical form document to submit an image of the document to the survey system for providing an electronic survey to one or more other devices. FIGS. 4A-4B illustrate GUIs on an administrator client device 400. The GUIs provide various views of a client application on the administrator client device 400 for sharing an electronic survey with one or more other devices (e.g., a plurality of respondent client devices associated with a plurality of respondents). The administrator client device 400 of FIGS. 4A-4B include a mobile computing device such as a smartphone, though the administrator client device 400 can be another type of computing device that allows the administrator to capture an image of a physical form document for converting to an electronic survey and then provide the electronic survey to one or more respondents.

With reference to FIG. 4A, the administrator client device includes an administrator application 402 that allows an administrator to perform various operations associated with converting a physical form document to an electronic survey, such as one or more of the operations described above with respect to FIG. 3A. Additionally, the administrator application 402 allows the administrator to review the electronic survey to verify that the electronic survey contains the correct information from the physical form document. The administrator application 402 can also allow the administrator to test the electronic survey by interacting with the electronic survey on the administrator client device 400.

As illustrated, the administrator application 402 includes a survey sharing interface 404 that provides a plurality of options for sharing an electronic survey that the survey system previously created. Specifically, the survey sharing interface 404 can display a plurality of graphical elements 406*a-c* associated with a variety of delivery methods for sharing the electronic survey with one or more respondents. For example, the administrator can opt to share the electronic survey with a respondent by selecting an email element 406*a*, a text element 406*b*, and a link element 406*c*. Accordingly, the administrator can send a link to one or more respondents by email, but text message, or by giving a direct HTML link to the electronic survey to the respondents (e.g., via respondent client devices corresponding to the respondents). Alternatively, the survey system can allow an administrator to provide a link to the survey via other methods, such as via a website of the administrator, instant message, etc.

After sharing the electronic survey with one or more respondents, the respondents can provide responses to the electronic survey to the survey system, as described in relation to FIGS. 3B-3F. The survey system can process the response data from the respondents to generate electronic versions of the completed form document such that the electronic versions of the completed form document include the responses. For instance, for each respondent, the survey system generates a completed form document within an electronic document such as the image 336 of FIG. 3G. The survey system can store each of the electronic documents for later access by the respondents and/or the administrator.

In one or more embodiments, the survey system allows an administrator to access the electronic documents including the completed form documents. As illustrated in FIG. 4B, the administrator application 402 includes a response management interface 408 that allows an administrator to view completed form documents from one or more respondents. For example, the response management interface 408 can include a dropdown menu 410 that includes a list of completed form documents from a plurality of respondents. To illustrate, as respondents complete the electronic survey, the survey system can generate the completed form documents and populate the dropdown menu 410 with the names of the corresponding respondents.

When the administrator selects a respondent from the dropdown menu 410, the administrator application 402 can highlight the selected respondent. Additionally, the administrator can then select a view element 412 to view the completed form document associated with the selected respondent within the client application 402. For example, the administrator application 402 can display the electronic version of the completed form document within an interface of the administrator application, similar to the client application 302 of FIG. 3G displaying the completed form document to the respondent. The administrator can verify whether the form document is completed correctly and then print and/or store the form document for the records of the administrator.

In one or more embodiments, if the administrator determines that the form document is incomplete, the administrator can use the administrator application 402 to notify the respondent. For example, the administrator can notify the respondent (e.g., by email, text, IM) to complete or correct one or more fields within the form document. In response to receiving a notification that the form document is not correct or not complete, the respondent can return to the electronic survey to modify or complete one or more electronic survey questions. For instance, the respondent can select an option to open the electronic survey or select the corresponding fields within the electronic document (e.g., within image 336 of FIG. 3G).

While FIGS. 3A-4B illustrate embodiments in which a survey system converts a physical form document to an electronic survey to allow a respondent to complete the physical form document by providing responses to questions within the electronic survey, the survey system can also capture and integrate information from completed physical form documents into response data of an electronic survey. For example, some respondents may prefer to fill out a physical form document instead of providing answers to an electronic survey. Accordingly, the survey system can analyze completed physical form documents (e.g., physical form documents on which a respondent has manually provided information) to generate responses for an electronic survey corresponding to the physical form document. Thus, the survey system allows an administrator to collect, organize, and analyze information collected from manually completed physical form documents, as well as information collected from an electronic survey associated with the physical form documents.

In one or more embodiments, the survey system can allow a respondent or a survey administrator to capture an image of a completed physical form document. The survey system can determine that the physical form document has been completed by analyzing the image and identifying different fields in the image. For example, the survey system analyzes the image to identify questions (including prompt portions and answer portions) in a plurality of fields of the physical form document. The survey system then analyzes the answer portions of the image to determine whether the answer portions are filled-in. If the survey system determines that one or more answer portions of the image are filled-in, the survey system can determine that the physical form document is completed.

Additionally, the survey system analyzes the content of the answer portions to determine and generate responses corresponding to the prompt portions. For example, the survey system analyzes a multiple choice response to determine which of a plurality of answer portions the respondent selected, and also what the response includes (e.g., by analyzing text of the selected answer portion). In another example, the survey system analyzes handwritten text within a text box to identify a response. Accordingly, the survey system analyzes each response to determine the responses to the corresponding questions and maps the responses to the questions to store as response data.

The survey system can also combine response data from completed physical form documents with response data from electronic versions of the form document. In particular, the survey system maps responses in the response data to questions in the form documents in both the completed physical form documents and the completed electronic versions. For instance, if a first respondent provides a response to a first question of an electronic version of a form document, and a second respondent provides a response to the first question of a physical version of the form document, the survey system can group the responses for reporting to the survey administrator. Thus, the survey system combines the response data so that the survey administrator can easily access and view the completed form document and/or response data regardless of which method respondents use to complete the form document (e.g., as described with reference to FIG. 4B).

Figure 5:
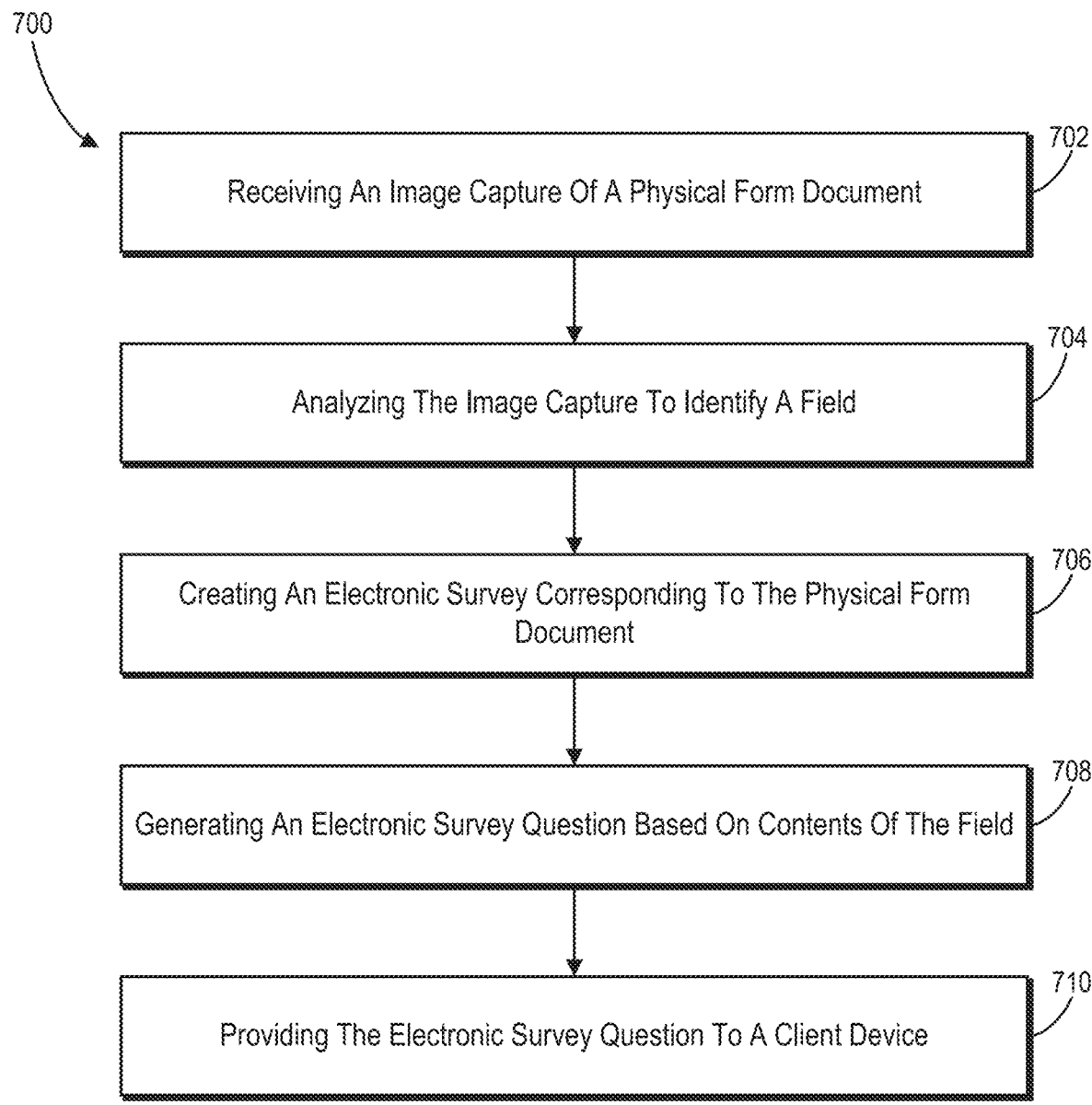
FIG. 5 illustrates a flowchart of a series of acts in a method for converting a physical form document to an electronic survey in accordance with one or more embodiments.
Figure 6:
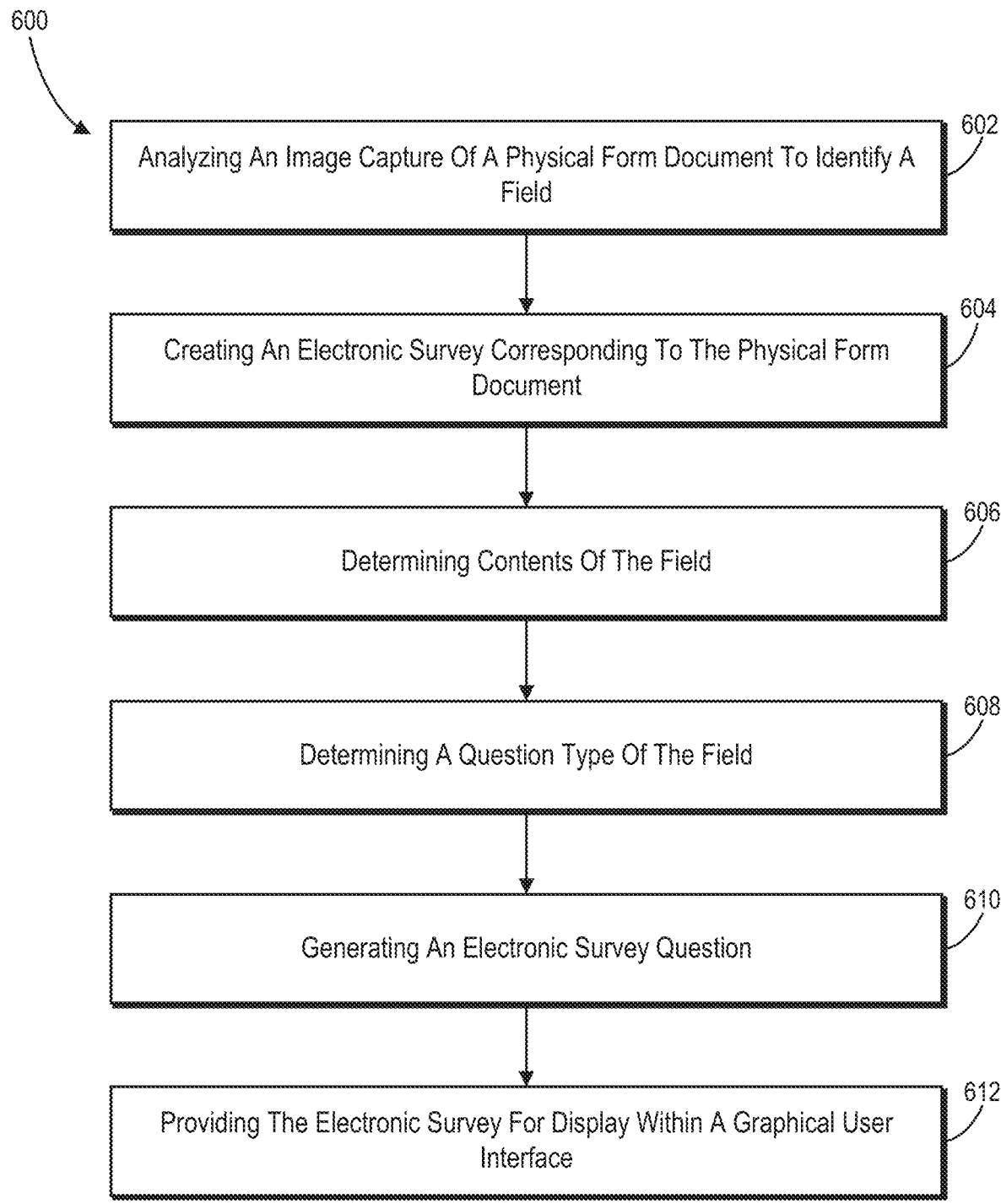
FIG. 6 illustrates a flowchart of a series of acts in a method for converting a physical form document to an electronic survey in accordance with one or more embodiments.

FIGS. 1-4B, the corresponding text, and the examples, provide a number of different systems, devices, and graphical user interfaces for converting a physical form document to an electronic survey and interacting with the electronic survey. In addition to the foregoing, embodiments disclosed herein also can be described in terms of flowcharts comprising acts and steps in a method for accomplishing a particular result. For example, FIGS. 5-6 illustrate flowcharts of exemplary methods in accordance with one or more embodiments disclosed herein. The methods described in relation to FIGS. 5-6 can be performed with less or more steps/acts or the steps/acts can be performed in differing orders. Additionally, the steps/acts described herein can be repeated or performed in parallel with one another or in parallel with different instances of the same or similar steps/acts.

FIG. 5 illustrates a flowchart of an example method 500 of converting a physical form document to an electronic survey. The method 500 includes an act 502 of receiving an image capture of a physical form document. For example, act 502 can involve receiving an image capture of the physical form document from a respondent client device associated with a respondent of the physical form document. Alternatively, act 502 can involve receiving an image capture of the physical form document from an administrator client device associated with an administrator of the physical form document.

The method 500 also includes an act 504 of analyzing the image capture to identify a field. For example, act 504 involves analyzing the image capture using image processing to identify a field comprising a question within the physical form document. Act 504 can involve identifying a prompt portion and one or more answer portions associated with the prompt portion within the field. For example, act 504 can involve determining that the field includes a text prompt and one or more answers that correspond to the text prompt. Act 504 can alternatively involve determining that the field includes a prompt or one or more answers comprising a non-text object.

Act 504 can also involve determining a location of the field within the image capture. For example, act 504 can involve determining an answer location and answer dimensions for an answer portion of the field. Act 504 can involve determining coordinate locations of the field. For example, the coordinate locations can include coordinates for corners, edges, or boundaries of the field within the image capture. Additionally, determining coordinate locations of the field can include determining coordinate locations for one or more answer portions of the field.

Act 504 can involve determining that an additional field within the physical form document comprises instructions corresponding to the field comprising the question. For example, act 504 can involve determining that contents of the additional field are associated with contents of the field comprising the question. Act 504 can also involve mapping the instructions from the additional field to the electronic survey question for displaying the instructions with the electronic survey question.

Furthermore, act 504 can involve identifying a plurality of fields within the physical form document, the plurality of fields including the field comprising the question. Act 504 can also involve determining a display order of electronic survey questions for the electronic survey based on contents of the plurality of fields and relative positions of the plurality of fields within the physical form document.

Additionally, the method 500 includes an act 506 of creating an electronic survey corresponding to the physical form document. For example, act 506 involves based on identifying the field, creating an electronic survey corresponding to the physical form document. Act 506 can involve creating the electronic survey using survey creation software, and assigning a unique survey identifier to the electronic survey. Act 506 can also involve creating the electronic survey in response to a request by a user to create the electronic survey from the physical form document.

The method 500 also includes an act 508 of generating an electronic survey question based on contents of the field. For example, act 508 involves generating an electronic survey question based on contents of the field, wherein the electronic survey question is associated with the electronic survey corresponding to the physical form document. Specifically, act 508 can involve converting the contents of the field to an electronic survey question by generating a question prompt and one or more answers to include the contents of the field.

Act 508 can involve assigning a question identifier to the electronic survey question, and mapping the question identifier to the field within the image capture. Additionally, act 508 can involve assigning an answer identifier to an answer associated with the electronic survey question, and mapping the answer identifier for the answer to a coordinate location corresponding to an answer portion of the answer within the image capture. Act 508 can also involve mapping the answer identifier to the question identifier and the survey identifier.

As part of act 508, or as an additional act, the method 500 can include identifying a plurality of possible question types based on the contents of the field, providing, for the field, a request for user verification of a question type from the plurality of possible question types. The method 500 can further include receiving user verification of the question type for the field, and generating the electronic survey question based on the received user verification of the question type. For example, the method 500 can include calculating a confidence level for the field, comparing the confidence level to a threshold, and requesting user verification if the confidence level does not meet the threshold.

The method 500 can further include training, using a database of available question types, a machine-learning model to map identified fields in physical form documents to question types. For example, the method 500 can include training the machine-learning model using a training dataset of a plurality of different question types, possible answers, labels, question layouts, and other characteristics of questions in form documents. The method 500 can also include generating, using the machine-learning model, the electronic survey question from the available question types based on the contents of the field.

The method 500 further includes an act 510 of providing the electronic survey question to a client device. For example, act 510 involves providing, to a client device, the electronic survey question for presentation to a user. Act 510 can involve providing the electronic survey comprising the electronic survey question for display within a client application in which a user can interact with the electronic survey question.

Act 510 can involve providing the electronic survey comprising the electronic survey question to a respondent client device. Alternatively, act 510 can involve providing the electronic survey comprising the electronic survey question to an administrator client device. For example, act 510 can involve providing a preview of the electronic survey to the administrator client device. The administrator client device can provide the electronic survey, or a link to the electronic survey, to one or more respondent client devices.

As part of act 510, or as an additional act, the method 500 can also include receiving, from the client device, response information for the answer of the electronic survey question, and identifying, using the mapping between the answer identifier mapped to the coordinate location, the coordinate location corresponding to answer portion of the answer within the image capture. The method 500 can also include inserting the response information into the image capture of the physical form document at the coordinate location corresponding to the answer portion, and providing, to the client device, the image capture with the inserted response information. For example, the method 500 can include inserting the response information as a layer into the image capture of the physical form document at the coordinate location corresponding to the answer portion. Alternatively, the method 500 can include creating an editable PDF document comprising an electronic version of the physical form document including the response information.

FIG. 6 illustrates a flowchart of another example method 600 of converting a physical form document to an electronic survey. The method 600 includes an act 602 of analyzing an image capture of a physical form document to identify a field. For example, act 602 involves an image capture of a physical form document to identify a field comprising a question within the physical form document. Act 602 can involve using image processing to identify a plurality of distinguishable visual features of the image capture, and identifying a field from the identified plurality of distinguishable visual features.

The method 600 also includes an act 604 of creating an electronic survey corresponding to the physical form document. For example, act 604 involves based on identifying the field, creating an electronic survey corresponding to the physical form document. Act 506 can involve assigning a unique survey identifier to the electronic survey and storing the unique survey identifier in a database associated with a plurality of electronic surveys.

The method 600 further includes an act 606 of determining contents of the field. For example, act 606 involves determining, using image processing, contents of the field comprising a question within the physical form document. Act 606 can also involve determining that the field comprises the question using optical character recognition and natural language processing. For example, act 606 can involve using optical character recognition to determine that the field comprises text, and using natural language processing to determine that the text comprises a question. Act 606 can also involve using object recognition to determine whether the field includes non-text information.

Additionally, the method 600 includes an act 608 of determining a question type of the field. For example, act 608 involves determining a question type of the field by comparing the contents of the field to a database of available question types. Act 608 can involve analyzing the contents of the field to determine a number of answers and a type of answers associated with a prompt within the field, and selecting the question type from the database of available question types based on the number of answers and the type of answers associated with the prompt within the field. Act 608 can involve using natural language processing to determine a context of the contents of the field, and determining the question type of the field based on the context. Act 608 can also use image processing to determine a layout of the field, and determining the question type of the field based on the determined layout. For example, act 608 can involve determining a number and type of answer portions corresponding to a prompt portion of the field, and determining the question type of the field based on the number and type of answer portions.

As part of act 608, or as an additional act, the method 600 can include determining a plurality of possible question types for the field based on the contents of the field, providing the plurality of possible questions types for the field to a user for user verification, and selecting the question type based on user verification of the question type. Additionally, the method 600 can include updating a machine-learning model for determining contents and question types of fields based on the user verification of the question type.

The method 600 also includes an act 610 of generating an electronic survey question. For example, act 610 involves generating an electronic survey question comprising the question type and contents from the field. Act 610 can also involve assigning a question identifier to the electronic survey question, assigning an answer identifier to an answer associated with the electronic survey question, and mapping the question identifier and the answer identifier to the field within the image capture. For example, act 610 can involve mapping the unique survey identifier to the field and then mapping the question identifier and the answer identifier to the unique survey identifier.

As part of act 610, or as an additional act, the method 600 can include identifying a plurality of fields within the image capture, the plurality of fields comprising a plurality of question fields, one or more instruction fields, and one or more title fields, and creating, for the electronic survey, an electronic survey question for each field from the plurality of fields.

The method 600 further includes an act 612 of providing the electronic survey for display within a graphical user interface. For example, act 612 involves providing, for display within a graphical user interface of a client device, the electronic survey question for presentation to a user. Act 612 can involve providing the electronic survey with the electronic survey question on a graphical user interface of a client device that provided the image capture of the physical form document. Act 612 can involve providing the electronic survey with the electronic survey question on a graphical user interface of a client device that did not provide the image capture of the physical form document.

The method 600 can also include receiving, from the client device, a response for the answer associated with the electronic survey question, determining a location of the answer within the image capture based on the answer identifier being mapped to the field, and inserting the received response at the location of the answer within the image capture. For example, the method 600 can involve assigning a response identifier to the response for the answer, mapping the response identifier to the answer identifier, and determining, based on the answer identifier being mapped to the field, coordinate information and size dimensions for an answer portion of the answer within the image capture. The method 600 can further involve inserting the received response at the location of the answer as a layer within the image capture.

Figure 7:
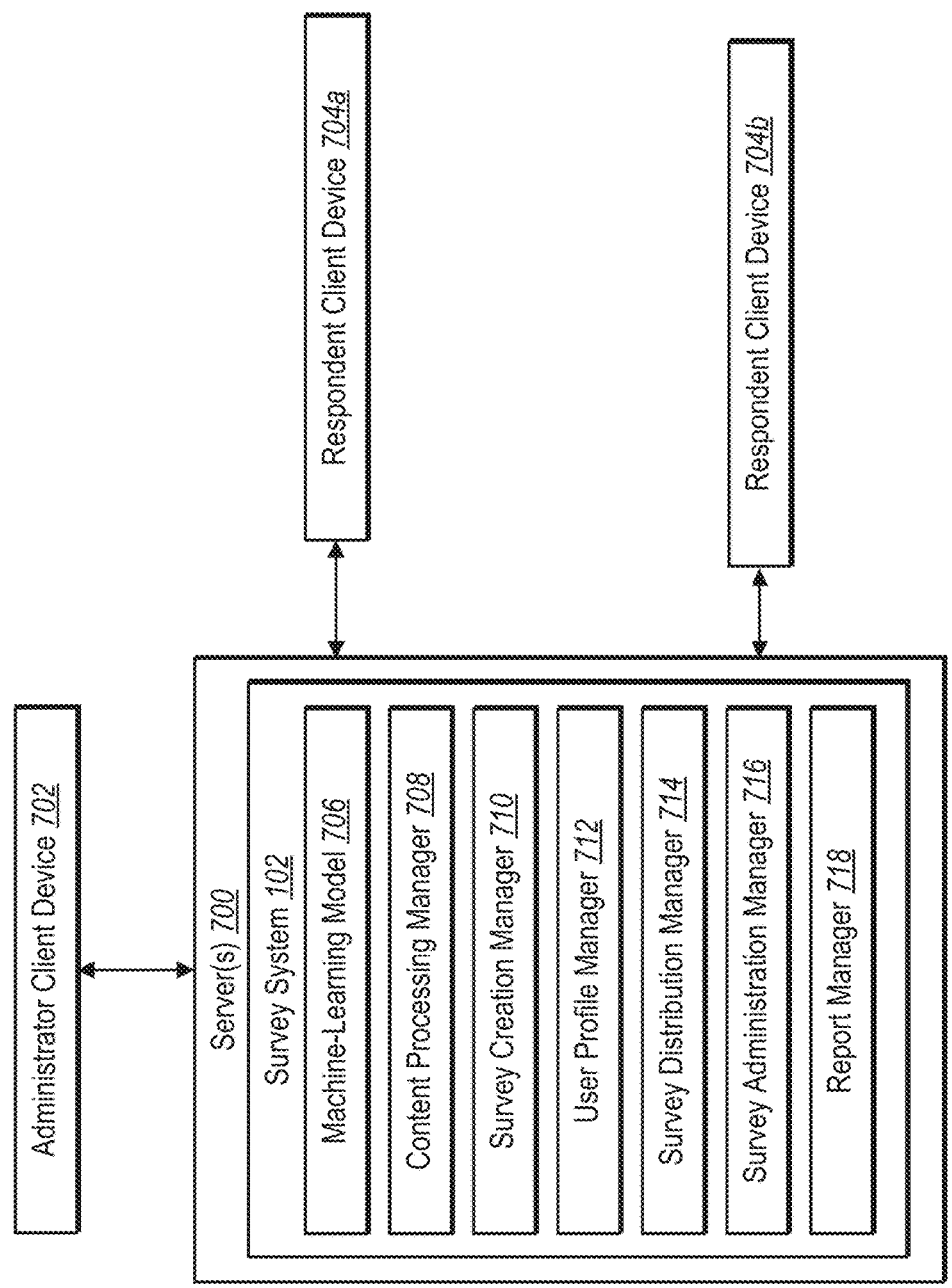
FIG. 7 illustrates a block diagram of the environment of FIG. 1 in which an electronic survey system operates in accordance with one or more embodiments.

FIG. 7 illustrates an example embodiment of an environment that includes the survey system 102 of FIG. 1. Specifically, the survey system 102 operates on a server 700. The server 700 communicates with a plurality of devices (administrator client device 702 and respondent client devices 704a, 704b). The survey system 102 includes a machine-learning model 706, a content processing manager 708, a survey creation manager 710, a user profile manager 712, a survey distribution manager 714, a survey administration manager 716, and a report manager 718. Although the survey system is depicted as having various components, the survey system 102 can have any number of additional or alternative components. Alternatively, one or more components of the survey system 102 can be combined into fewer components or divided into more components. Additionally, although FIG. 7 illustrates the survey system 102 on a single server, the survey system 102 can be on any number of server devices or on a single device (e.g., one of the administrator client device 702 or the respondent client devices 704a, 704b)

Figure 9:
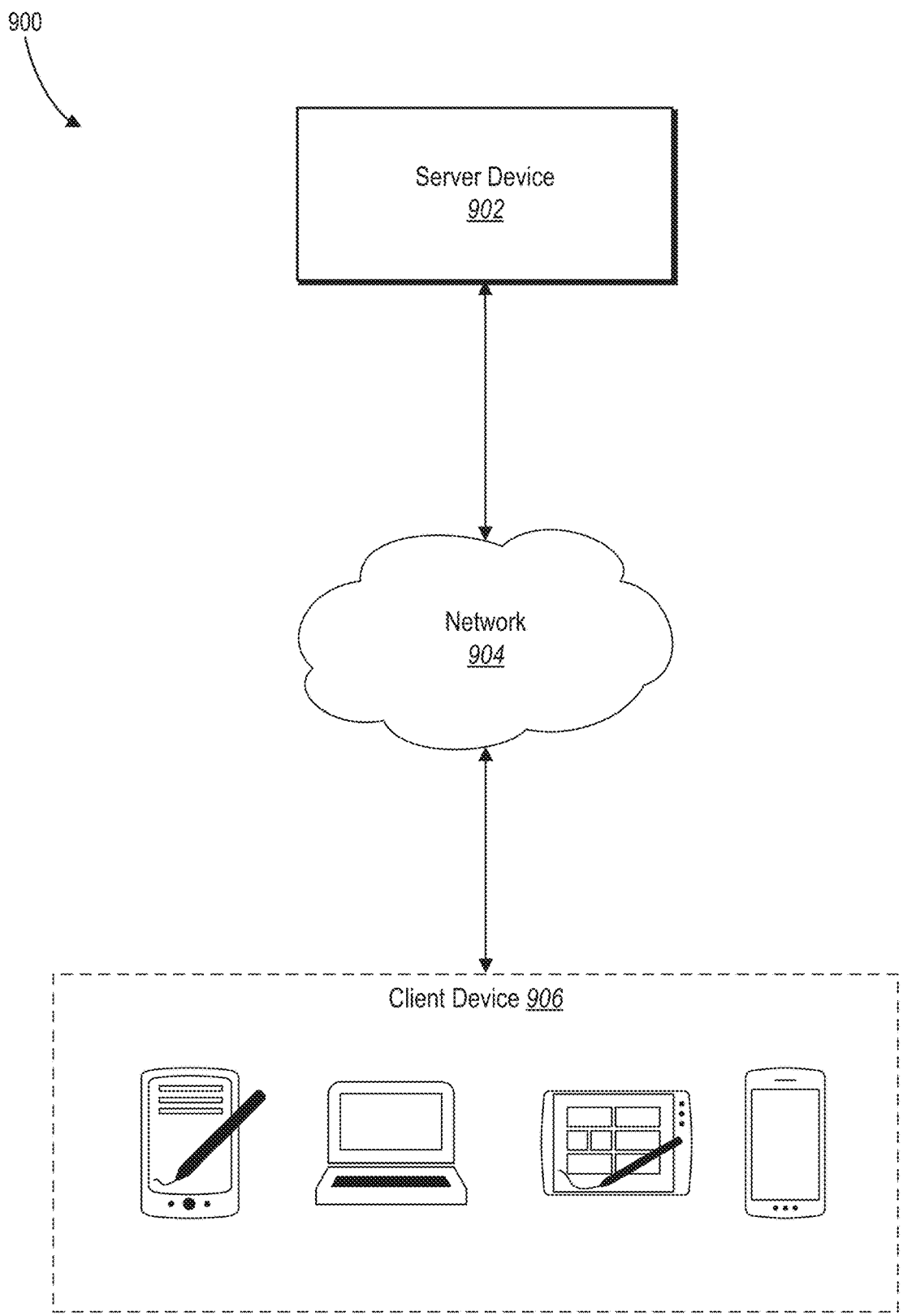
FIG. 9 illustrates a networking environment of an electronic survey system in accordance with one or more embodiments.

In one or more embodiments, each of the components and subcomponents of the survey system 102 can be in communication with one another using any suitable communication technologies. It will be recognized that although the subcomponents of the survey system 102 are shown to be separate in FIG. 7, any of the subcomponents can be combined into fewer components, such as into a single component, or divided into more components as can serve a particular implementation. Furthermore, although the components of FIG. 9 are described in connection with the survey system 102, at least some of the components for performing operations in conjunction with the survey system 102 described herein can be implemented on other devices and/or with other systems.

The components of the survey system 102 can include software, hardware, or both. For example, the components of the survey system 102 (e.g., the machine-learning model 706, the content processing manager 708, the survey creation manager 710, the user profile manager 712, the survey distribution manager 714, the survey administration manager 716, and the report manager 718) can include one or more instructions stored on computer-readable storage mediums and executable by processors of one or more computing devices. When executed by the one or more processors, the computer-executable instructions of the survey system 102 can cause the computing device(s) to perform the survey creation and administration processes described herein. Alternatively, the components of the survey system 102 can comprise hardware, such as a special purpose processing device to perform a certain function or group of functions. Additionally, the components of the survey system 102 can comprise a combination of computer-executable instructions and hardware.

Furthermore, the components of the survey system 102 performing the functions described herein with respect to survey creation and administration can, for example, be implemented as part of a stand-alone application, as a module of an application, as part of a suite of applications, as a plug-in for applications including content creation applications, as a library function or functions that can be called by other applications, and/or as a cloud-computing model. Thus, various components of the survey system 102 can be implemented as part of a stand-alone application on a personal computing device or a mobile device. For example, the components of the survey system 102 can be implemented in any application that allows the creation and administration of surveys to users, as can serve a particular embodiment.

As illustrated, the survey system 102 includes a machine-learning model 706. The machine-learning model 706 allows the survey system 102 to match content of fields in an image of a physical form document to question types. In one or more embodiments, the survey system 102 trains the machine-learning model 706 using a training dataset comprising a plurality of form documents with a plurality of fields that include a variety of question types and content types. The training dataset allows the machine-learning model 706 to distinguish question types and content types according to an available set of question types and content types (e.g., a list of possible question types and content types corresponding to electronic survey questions that the survey creation manager 710 is capable of generating). The survey system 102 can also train the machine-learning model in response to manual user input during conversion of a form document to an electronic survey.

The survey system 102 also includes a content processing manager 708 that facilitates the analysis of an image to identify different parts of a form document. Specifically, the content processing manager 708 uses a variety of image processing techniques including text and non-text object recognition. For example, the content processing manager 708 can use optical character recognition to identify text within an image. Additionally, the content processing manager 708 can use object recognition to identify shapes, images, and patterns within an image. The content processing manager 708 uses the image processing techniques to distinguish groups of content as separate fields within the image.

In conjunction with identifying fields within an image, the content processing manager 708 can use various processing techniques to analyze the contents of the fields. In particular, the content processing manager 708 can use natural language processing to determine context of text within a field. The content processing manager 708 can also use image processing to determine contents of non-text objects within a field. Additionally, the content processing manager 708 can use image processing to determine relationships between objects in a field, including a layout, which can allow the survey system 102 to determine a question type for the field.

The content processing manager 708 also analyzes the image to determine location information of components in the image. For example, the content processing manager 708 determines coordinate locations for answer portions for completing the form document after a respondent answers. Additionally, the content processing manager 708 uses location information of fields in the image to determine an order of the fields for the survey creation manager 710 to use in creating an electronic survey.

The survey system 102 includes a survey creation manager 710. The survey creation manager 710 manages the creation of a survey, including the composition of one or more survey questions. For example, the survey creation manager 710 receives information from the content processing manager 708 to create a survey with questions corresponding to the identified fields in an image of a physical form document. To illustrate, the survey creation manager 710 can receive information that a field includes content corresponding to a question type and then create an electronic survey question of the question type consistent with the contents of the field.

The survey creation manager 710 can also provide other features to assist in the conversion of a form document to an electronic survey. For instance, the survey creation manager 710 can provide alternative wording for questions identified in an image of a physical form document. To illustrate, the survey creation manager 710 can create questions including unabbreviated words that were abbreviated in the physical form document. Further, the survey creation manager 710 can allow an administrator to preview the survey as if a respondent was viewing the survey on the respondent's client device.

The survey creation manager 710 also assigns identifiers to the various components of a survey including the survey itself, questions, answers, and labels or other description/ instructions from the physical form document. The survey creation manager 710 stores mappings between the questions and their corresponding answers, the survey, and locations in the image.

The survey system 102 also includes a user profile manager 712 to manage and store user profile information for an administrator and a plurality of respondents. Specifically, the user profile manager 712 maintains user profiles including information about an administrator and a plurality of respondents. For example, the user profile manager 712 can manage a user profile for an administrator who uploaded an image of a physical form document for providing response information after receiving responses to the corresponding electronic survey. The user profile manager 712 can also manage a plurality of user profiles for a plurality of respondents who have registered with a survey service and/or opted into receiving surveys by downloading an application associated with the survey system 102. The user profile manager 712 can obtain the profile information based on information that the respondents provide to the survey system 102 (e.g., via a registration website or based on a survey that the respondents complete).

In one or more embodiments, a user profile includes user profile information that describes one or more characteristics of the respondent. For example, user profile information can include information about the respondent's geographic location, the respondent's demographics (e.g., sex, race, socio-economic status, political affiliation), the respondent's name (or other identifier), or other information that can be useful in reporting results of the survey. In at least some examples, user profile information includes device information that the user profile manager 712 obtains from a respondent client device in response to a request to provide a survey to the respondent client device. Thus, the user profile manager 712 can obtain information that describes at least a location and a device type of the respondent client device without requiring the respondent to provide other personal information.

As mentioned, the survey system 102 also includes a survey distribution manager 714. After the survey system 102 converts an image of a physical form document to an electronic survey, a survey administrator can distribute the survey to a plurality of respondents. When the survey system 102 administers a survey, the survey distribution manager 714 can send the survey to respondents based on the administrator providing a link to the survey to the respondents, or based on the administrator indicating the survey system 102 to provide the survey to selected respondents.

The survey system 102 also includes a survey administration manager 716 that facilitates the administration of surveys to respondents. In particular, administering surveys allows the respondents to provide responses to survey questions within a client application (e.g., a web browser). The survey administration manager 716 can administer surveys by allowing the respondents to interact with the questions by selecting answers or inputting responses into the client application. Additionally, the survey administration manager 716 can store response information and use the response information to complete an electronic version of the physical form document. The survey administration manager 716 can also use the response information to update user profiles.

The survey system 102 further includes a report manager 718 for generating reports based on received response data. Specifically, a survey creator, an administrator, or other user can want to view responses or a summary of response data for an event. The report manager 718 receives a request to generate a report and communicates with the survey administration manager 716 to generate the report using the response data. To illustrate, the report manager 718 can generate one or more visualizations of the response data from a plurality of completed form documents corresponding to a plurality of different respondents. To generate a visualization, the report manager 718 obtains a plurality of response data point sets and plots the response data point sets to a graph for the user to view. Alternatively, the report manager 718 can allow the administrator to view the completed form documents directly.

As described herein, each of the components of the survey system 102 can communicate with one or more storage devices of the server 700 to store data associated with events, including surveys, survey questions, response data, user profiles, content, and reports. For example, the components of the survey system 102 can communicate with a storage device as described in more detail below in FIG. 8. The components of the survey system 102 can also communicate with storage device(s) to retrieve previously stored data.

Embodiments of the present disclosure can comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein can be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions can be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure can be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure can also be practiced in distributed system environments where local and remote computer systems, which are linked (either by hardwired data links, wireless data links, or by a combination of hardwired and wireless data links) through a network, both perform tasks. In a distributed system environment, program modules can be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 8:
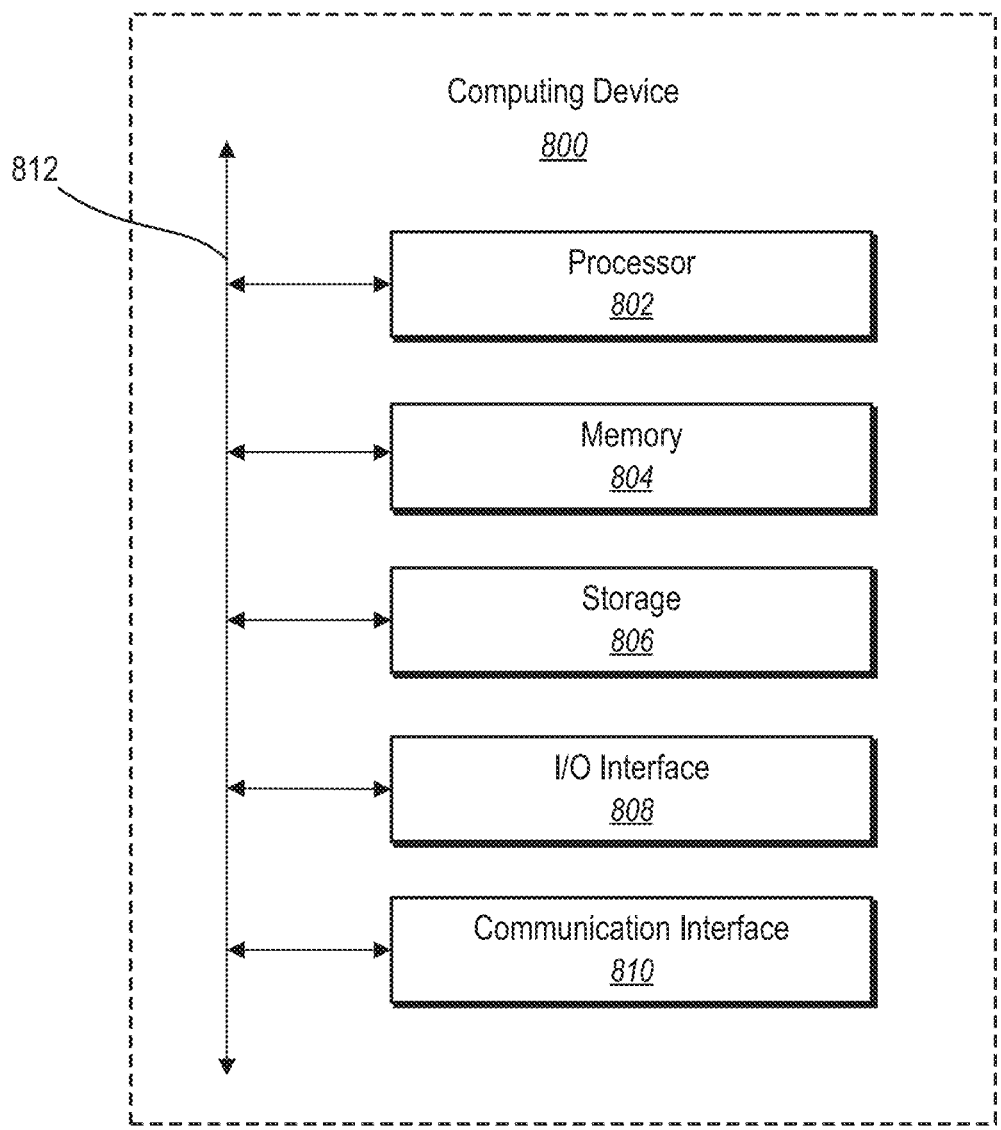
FIG. 8 illustrates a block diagram of a computing device in accordance with one or more embodiments.

FIG. 8 illustrates a block diagram of exemplary computing device 800 that can be configured to perform one or more of the processes described above. One will appreciate that one or more computing devices such as the computing device 800 can implement the various devices of the environment 100 of FIG. 1. As shown by FIG. 8, the computing device 800 can comprise a processor 802, a memory 804, a storage device 806, an I/O interface 808, and a communication interface 810, which can be communicatively coupled by way of a communication infrastructure 812. While an exemplary computing device 800 is shown in FIG. 8, the components illustrated in FIG. 8 are not intended to be limiting. Additional or alternative components can be used in other embodiments. Furthermore, in certain embodiments, the computing device 800 can include fewer components than those shown in FIG. 8. Components of the computing device 800 shown in FIG. 8 will now be described in additional detail.

In one or more embodiments, the processor 802 includes hardware for executing instructions, such as those making up a computer program. As an example and not by way of limitation, to execute instructions, the processor 802 can retrieve (or fetch) the instructions from an internal register, an internal cache, the memory 804, or the storage device 806 and decode and execute them. In one or more embodiments, the processor 802 can include one or more internal caches for data, instructions, or addresses. As an example and not by way of limitation, the processor 802 can include one or more instruction caches, one or more data caches, and one or more translation lookaside buffers (TLBs). Instructions in the instruction caches can be copies of instructions in the memory 804 or the storage 806.

The memory 804 can be used for storing data, metadata, and programs for execution by the processor(s). The memory 804 can include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 804 can be internal or distributed memory.

The storage device 806 includes storage for storing data or instructions. As an example and not by way of limitation, storage device 806 can comprise a non-transitory storage medium described above. The storage device 806 can include a hard disk drive (HDD), a floppy disk drive, flash memory, an optical disc, a magneto-optical disc, magnetic tape, or a Universal Serial Bus (USB) drive or a combination of two or more of these. The storage device 806 can include removable or non-removable (or fixed) media, where appropriate. The storage device 806 can be internal or external to the computing device 800. In one or more embodiments, the storage device 806 is non-volatile, solid-state memory. In other embodiments, the storage device 806 includes read-only memory (ROM). Where appropriate, this ROM can be mask programmed ROM, programmable ROM (PROM), erasable PROM (EPROM), electrically erasable PROM (EEPROM), electrically alterable ROM (EAROM), or flash memory or a combination of two or more of these.

The I/O interface 808 allows a user to provide input to, receive output from, and otherwise transfer data to and receive data from computing device 800. The I/O interface 808 can include a mouse, a keypad or a keyboard, a touch screen, a camera, an optical scanner, network interface, modem, other known I/O devices or a combination of such I/O interfaces. The I/O interface 808 can include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 808 is configured to provide graphical data to a display for presentation to a user. The graphical data can be representative of one or more graphical user interfaces and/or any other graphical content as can serve a particular implementation.

The communication interface 810 can include hardware, software, or both. In any event, the communication interface 810 can provide one or more interfaces for communication (such as, for example, packet-based communication) between the computing device 800 and one or more other computing devices or networks. As an example and not by way of limitation, the communication interface 810 can include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 810 can facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks can be wired or wireless. As an example, the communication interface 810 can facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 810 can facilitate communications various communication protocols. Examples of communication protocols that can be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 812 can include hardware, software, or both that couples components of the computing device 800 to each other. As an example and not by way of limitation, the communication infrastructure 812 can include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

FIG. 9 illustrates an example network environment 900 for a survey system 102. Network environment 900 includes a client device 906, and a server device 902 connected to each other by a network 904. Although FIG. 9 illustrates a particular arrangement of client device 906, server device 902, and network 904, this disclosure contemplates any suitable arrangement of client device 906, server device 902, and network 904. As an example and not by way of limitation, two or more of client device 906, and server device 902 can be connected to each other directly, bypassing network 904. As another example, two or more of client device 906 and server device 902 can be physically or logically co-located with each other in whole, or in part. Moreover, although FIG. 9 illustrates a particular number of client devices 906, server devices 902, and networks 904, this disclosure contemplates any suitable number of client devices 906, server devices 902, and networks 904. As an example and not by way of limitation, network environment 900 can include multiple client devices 906, server devices 902, and networks 904.

This disclosure contemplates any suitable network 904. As an example and not by way of limitation, one or more portions of network 904 can include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 904 can include one or more networks 904.

Links can connect client device 906, and server device 902 to communication network 904 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 900. One or more first links can differ in one or more respects from one or more second links.

In particular embodiments, client device 906 can be an electronic device including hardware, software, or embedded logic components or a combination of two or more such components and capable of carrying out the appropriate functionalities implemented or supported by client device 906. As an example and not by way of limitation, a client device 906 can include any of the computing devices discussed above in relation to FIG. 8. A client device 906 can enable a network user at client device 906 to access network 904. A client device 906 can enable its user to communicate with other users at other client devices or systems.

In particular embodiments, client device 906 can include a web browser, such as MICROSOFT INTERNET EXPLORER, GOOGLE CHROME, or MOZILLA FIREFOX, and can have one or more add-ons, plug-ins, or other extensions, such as TOOLBAR or YAHOO TOOLBAR. A user at client device 906 can enter a Uniform Resource Locator (URL) or other address directing the web browser to a particular server (such as server, or a server associated with a third-party system), and the web browser can generate a Hyper Text Transfer Protocol (HTTP) request and communicate the HTTP request to server. The server can accept the HTTP request and communicate to client device 906 one or more Hyper Text Markup Language (HTML) files responsive to the HTTP request. Client device 906 can render a webpage based on the HTML files from the server for presentation to the user. This disclosure contemplates any suitable webpage files. As an example and not by way of limitation, webpages can render from HTML files, Extensible Hyper Text Markup Language (XHTML) files, or Extensible Markup Language (XML) files, according to particular needs. Such pages can also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser can use to render the webpage) and vice versa, where appropriate.

In particular embodiments, server device 902 can include a variety of servers, sub-systems, programs, modules, logs, and data stores. In particular embodiments, server device 902 can include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 902 can also include suitable components such as network interfaces, security mechanisms, load balancers, failover servers, management-and-network-operations consoles, other suitable components, or any suitable combination thereof.

In particular embodiments, server device 902 can include one or more user-profile stores for storing user profiles. A user profile can include, for example, biographic information, demographic information, behavioral information, social information, or other types of descriptive information, such as work experience, educational history, hobbies or preferences, interests, affinities, or location. Interest information can include interests related to one or more categories. Categories can be general or specific The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments can be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A method, comprising:
receiving an image capture of a physical form document;
analyzing, by at least one processor, the image capture using image processing to identify a field comprising a question within the physical form document;
creating an electronic survey corresponding to the physical form document within an electronic survey system;
generating, by the at least one processor and based on contents of the field, an electronic survey question for the electronic survey corresponding to the physical form document;
adding the electronic survey question to the electronic survey within the electronic survey system; and
administering the electronic survey by providing, to a client device, the electronic survey question for presentation to a user and prompting the user to provide a response to the electronic survey question.

2. The method as recited in claim 1, wherein analyzing the image capture to identify the field comprises identifying a prompt portion and one or more answer portions associated with the prompt portion within the field.

3. The method as recited in claim 1, wherein analyzing the image capture to identify the field comprises:
determining a location of the field within the image capture; and
determining an answer location and answer dimensions for an answer portion of the field.

4. The method as recited in claim 1, wherein:
analyzing the image capture to identify the field comprises determining that an additional field within the physical form document comprises instructions corresponding to the field; and
generating the electronic survey question comprises mapping the instructions from the additional field to the electronic survey question.

5. The method as recited in claim 1, further comprising:
training, using a database of available question types, a machine-learning model to map identified fields in physical form documents to question types; and
wherein generating the electronic survey question comprises generating, using the machine-learning model, the electronic survey question from the available question types based on the contents of the field.

6. The method as recited in claim 1, wherein analyzing the image capture to identify the field further comprises:
identifying a plurality of fields within the physical form document, the plurality of fields including the field; and
determining a display order of electronic survey questions for the electronic survey based on contents of the plurality of fields and relative positions of the plurality of fields within the physical form document.

7. The method as recited in claim 1, wherein generating the electronic survey question comprises:
assigning a question identifier to the electronic survey question; and
mapping the question identifier to the field within the image capture.

8. The method as recited in claim 7, wherein generating the electronic survey question further comprises:
assigning an answer identifier to an answer associated with the electronic survey question; and
mapping the answer identifier for the answer to a coordinate location corresponding to an answer portion of the answer within the image capture.

9. The method as recited in claim 8, further comprising:
receiving, from the client device, response information for the answer of the electronic survey question;
identifying, using the mapping between the answer identifier mapped to the coordinate location, the coordinate location corresponding to answer portion of the answer within the image capture;
inserting the response information into the image capture of the physical form document at the coordinate location corresponding to the answer portion; and
providing, to the client device, the image capture with the inserted response information.

10. The method as recited in claim 1, further comprising:
identifying a plurality of possible question types based on the contents of the field;
providing, for the field, a request for user verification of a question type from the plurality of possible question types;
receiving user verification of the question type for the field; and
generating the electronic survey question based on the received user verification of the question type.

11. The method as recited in claim 1, further comprising:
receiving a second image capture of a completed physical form document;
analyzing the second image capture using image processing to determine that the completed physical form document includes a field comprising the question;
analyzing the field of the completed physical form document to identify a completed answer portion comprising a response; and
mapping the response from the completed answer portion to the question to store as response data for the question with responses to the electronic survey question in the electronic survey.

12. A method, comprising:
analyzing, by at least one processor, an image capture of a physical form document to identify a field comprising a question within the physical form document;
creating, by the at least one processor, an electronic survey corresponding to the physical form document within an electronic survey system;
determining, by the at least one processor using image processing, contents of the field;
determining, by the at least one processor, a question type of the field by comparing the contents of the field to a database of available question types;
generating, by the at least one processor and based on contents of the field, an electronic survey question comprising the question type and contents from the field
adding the electronic survey question to the electronic survey within the electronic survey system; and
administering the electronic survey by providing, for display within a graphical user interface of a client device, the electronic survey question for presentation to a user and prompting the user to provide a response to the electronic survey question.

13. The method as recited in claim 12, wherein determining contents of the field comprises determining that the field comprises the question using optical character recognition and natural language processing.

14. The method as recited in claim 12, wherein determining the question type of the field comprises:
- analyzing the contents of the field to determine a number of answers and a type of answers associated with a prompt within the field; and
- selecting the question type from the database of available question types based on the number of answers and the type of answers associated with the prompt within the field.

15. The method as recited in claim 12, wherein generating the electronic survey question comprises:
- assigning a question identifier to the electronic survey question;
- assigning an answer identifier to an answer associated with the electronic survey question; and
- mapping the question identifier and the answer identifier to the field within the image capture.

16. The method as recited in claim 15, further comprising:
- receiving, from the client device, a response for the answer associated with the electronic survey question;
- determining a location of the answer within the image capture based on the answer identifier being mapped to the field; and
- inserting the received response at the location of the answer within the image capture.

17. The method as recited in claim 12, wherein determining the question type of the field comprises:
- determining a plurality of possible question types for the field based on the contents of the field;
- providing the plurality of possible questions types for the field to a user for user verification; and
- selecting the question type based on user verification of the question type.

18. The method as recited in claim 12, further comprising:
- identifying a plurality of fields within the image capture, the plurality of fields comprising a plurality of question fields, one or more instruction fields, and one or more title fields; and
- creating, for the electronic survey, an electronic survey question for each field from the plurality of fields.

19. A system, comprising:
- at least one processor; and
- a non-transitory computer readable storage medium comprising instructions that, when executed by the at least one processor, cause the system to:
  - receive an image capture of a physical form document;
  - analyze the image capture using image processing to identify a field comprising a question within the physical form document;
  - create an electronic survey corresponding to the physical form document within an electronic survey system;
  - generate an electronic survey question based on contents of the field for the electronic survey corresponding to the physical form document;
  - add the electronic survey question to the electronic survey within the electronic survey; and
  - administer the electronic survey by providing, to a client device, the electronic survey question for presentation to a user and prompting the user to provide a response to the electronic survey question.

20. The system as recited in claim 19, further comprising instructions that, when executed by the at least one processor, cause the system to generate the electronic survey by:
- processing the image capture using image processing to determine the contents of the field, the contents comprising a prompt and one or more answers;
- determining, based on the prompt and the one or more answers, a question type for the electronic survey question; and
- generating, using the determined question type, the electronic survey question to include the prompt and one or more answers.

* * * * *